(12) United States Patent
Martin, Jr.

(10) Patent No.: US 10,729,236 B2
(45) Date of Patent: Aug. 4, 2020

(54) RECONFIGURABLE CARRYING DEVICES FOR MATERIAL HANDLING

(71) Applicant: Intelligrated Headquarters, LLC, Mason, OH (US)

(72) Inventor: Bernard S. Martin, Jr., South Webster, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/987,496

(22) Filed: May 23, 2018

(65) Prior Publication Data

US 2019/0357672 A1 Nov. 28, 2019

(51) Int. Cl.
*B62B 3/02* (2006.01)
*A47B 46/00* (2006.01)

(52) U.S. Cl.
CPC ............ *A47B 46/005* (2013.01); *B62B 3/025* (2013.01)

(58) Field of Classification Search
CPC ....... A47B 45/00; A47B 46/005; A47B 51/00; B62B 3/005; B62B 3/02; B62B 3/022
USPC .......... 280/47.34, 47.35, 79.3; 211/207, 208, 211/209, 190, 169, 173, 174, 90.02, 211/90.03, 90.04
See application file for complete search history.

(56) References Cited

U.S. PATENT DOCUMENTS

| | | | | |
|---|---|---|---|---|
| 3,782,746 A | * | 1/1974 | Isaacs | B62B 3/002 280/33.996 |
| 4,045,043 A | * | 8/1977 | Fourrey | B62B 3/002 280/79.3 |
| 4,099,735 A | * | 7/1978 | Becker, III | B62B 5/0006 211/133.2 |
| 4,427,379 A | * | 1/1984 | Duran | B62B 3/00 211/182 |
| 4,948,154 A | * | 8/1990 | Guggenheim | A61G 12/001 150/154 |
| 4,958,841 A | * | 9/1990 | Keen | A47F 5/13 211/162 |
| 4,986,555 A | * | 1/1991 | Andreen | A47L 13/10 280/47.35 |
| 5,131,547 A | * | 7/1992 | Goldberg | A47F 5/13 108/166 |

(Continued)

FOREIGN PATENT DOCUMENTS

WO  WO 2014/092331 A1  6/2014

OTHER PUBLICATIONS

Krane AMG 750 Multi-Mode Folding Longbed 6-Wheeled Cart, 750-Pound Capacity—Advanced Moving Gear [online] [retrieved May 4, 2017]. Retrieved from the Interner: <URL: http://www.kranecarts.com/amg750>. (2017) 3 pages.

*Primary Examiner* — Jeffrey J Restifo
(74) *Attorney, Agent, or Firm* — Alston & Bird LLP

(57) ABSTRACT

A reconfigurable carrying device, such as a cart, is provided for storing and/or transporting objects. The cart may include a first storage section for receiving the objects, and a second storage section pivotally attached to the first storage section. The second storage section may be movable upwards relative to the first storage section to be positioned on top of the first storage section in a first mode of operation of the cart and may be movable downwards relative to the position in the first mode of operation to be positioned adjacent to the first storage section in a second mode of operation of the cart.

18 Claims, 13 Drawing Sheets

(56) References Cited

U.S. PATENT DOCUMENTS

| | | | | |
|---|---|---|---|---|
| 5,324,054 A * | 6/1994 | Kleier | B62B 3/002 | 220/485 |
| 5,380,022 A * | 1/1995 | Dennis | A47B 5/02 | 280/47.35 |
| 5,452,908 A * | 9/1995 | Bencic | B25H 1/04 | 280/47.18 |
| 5,713,584 A * | 2/1998 | Crane | B62B 3/006 | 280/47.35 |
| 5,718,441 A * | 2/1998 | Kern | A47B 57/14 | 211/187 |
| 5,806,864 A * | 9/1998 | Zielinski | B62B 3/02 | 280/42 |
| 5,857,756 A * | 1/1999 | Fehre | A47B 46/005 | 312/246 |
| 5,913,270 A * | 6/1999 | Price | A47J 37/0763 | 108/101 |
| 6,402,167 B1 * | 6/2002 | Calleja | B62B 3/006 | 108/55.1 |
| 6,588,608 B2 * | 7/2003 | Pater | B65G 1/02 | 211/151 |
| 6,869,097 B2 * | 3/2005 | Prather | B62B 3/027 | 280/33.996 |
| 6,966,574 B1 | 11/2005 | Dahl | | |
| 7,213,816 B2 * | 5/2007 | Gregory | B62B 3/106 | 280/33.996 |
| 7,229,085 B2 * | 6/2007 | Pederson | A63B 47/00 | 280/79.3 |
| 7,540,510 B2 * | 6/2009 | Sparkowski | A47F 5/137 | 108/106 |
| 7,946,434 B1 * | 5/2011 | Greenspon | A47G 25/0685 | 211/195 |
| 7,967,325 B1 * | 6/2011 | Burton | A01M 31/006 | 280/38 |
| 8,342,544 B1 * | 1/2013 | Blewett | B62B 3/022 | 211/189 |
| 8,418,709 B2 * | 4/2013 | Lindeman | B62B 3/02 | 135/96 |
| 8,424,983 B1 * | 4/2013 | Strauss | A47B 51/00 | 312/247 |
| 8,616,388 B2 * | 12/2013 | Butler | A47B 43/00 | 108/106 |
| 8,764,031 B2 * | 7/2014 | Finstad, III | A47B 57/06 | 211/187 |
| 8,764,046 B2 * | 7/2014 | Baldemor | B62B 1/002 | 280/47.29 |
| 8,931,420 B2 * | 1/2015 | Larson | B62B 3/02 | 108/54.1 |
| 8,944,444 B1 * | 2/2015 | Tvrdy | B62B 3/005 | 280/47.35 |
| 8,998,246 B2 * | 4/2015 | Griffard | B62B 3/025 | 280/47.34 |
| 9,079,597 B2 * | 7/2015 | Gonzalez | B62B 3/02 | |
| 9,655,448 B2 * | 5/2017 | Tiilikainen | B62B 3/005 | |
| 9,801,465 B1 * | 10/2017 | Finch, Jr. | A47B 51/00 | |
| 9,913,533 B1 * | 3/2018 | Ke | A47B 43/00 | |
| 9,919,414 B1 * | 3/2018 | Liu | A47B 51/00 | |
| 10,143,300 B2 * | 12/2018 | Johnson | A47B 55/02 | |
| 10,292,491 B1 * | 5/2019 | Ke | A47B 43/00 | |
| 2009/0289535 A1 * | 11/2009 | Weber | A47B 46/005 | 312/317.1 |
| 2012/0312760 A1 * | 12/2012 | Larson | B62H 3/12 | 211/1.51 |

\* cited by examiner

RECONFIGURABLE CARRYING DEVICES FOR MATERIAL HANDLING

TECHNOLOGICAL FIELD

Example embodiments of the present invention relate generally to carrying devices and, more particularly, to carrying devices used in material handling environment to store and transport goods and articles.

BACKGROUND

Carrying devices, such as carts, racks, containers, trolleys, and the like, are used in material handling environment to store and/or transport goods and articles. Carrying devices may need to be loaded and/or unloaded by human operators. As such, carrying devices, such as carts, are subject to height constraints to enable a human operator to reach all shelves of the carts. Further, carrying devices may be required to be transported in a transportation vehicle or vessel, and/or stored in a warehouse. However, when in transportation and/or storage mode, a low height carrying device causes a wasted overhead space in the transportation vehicle, vessel and/or the warehouse.

Applicant has identified several technical challenges associated with conventional carrying devices and other associated systems and methods. Through applied effort, ingenuity, and innovation, many of these identified challenges have been overcome by developing solutions that are included in embodiments of the present invention, many examples of which are described in detail herein.

BRIEF SUMMARY

The illustrative embodiments of the present disclosure provide a cart for storing and/or transporting objects. The cart may be configured in a low height loading and/or unloading configuration such that a human operator may access all shelves of the cart. Further, the cart may be adapted to be re-configured in a storage and/or transport configuration, such that, at least a portion of the cart may be repositioned to be stacked above the cart. For example, a cart with four columns or adjacent vertical sections for storing objects, may be re-configured such that the outer two columns or vertical sections may be repositioned on top of the remaining two columns or vertical sections of the cart. This results in a tall-narrow configuration of the cart, which is desired for avoiding overhead space wastage in a warehouse and/or transport vessel. Further, the tall-narrow configuration of the cart also results in a reduced cubic space occupied in a warehouse and/or transport vessel. Thus, the reconfigurable cart of the present disclosure operates in a low-wide configuration in loading and/or unloading mode and may be transformed to a tall-narrow configuration for storing and/or transporting in a transport vessel.

According to at least one aspect of the present disclosure, a cart for transporting objects is provided. The cart may include a first storage section. The first storage section may include a fixed frame having a first horizontal base having a first storage surface for receiving the objects, a wheeled assembly disposed at a bottom of the first horizontal base, and two or more first uprights disposed at opposite ends of the first horizontal base. The cart may include a second storage section having one or more movable frames. The movable frame may include a second horizontal base having a second storage surface for receiving the objects, and second uprights disposed at opposite ends of the second horizontal base. The cart may further include one or more support arms pivotally coupled to the fixed frame at a first end of the support arm and pivotally coupled to the at least one movable frame at a second end of the support arm. The support arm may move the second end upwards relative to the first end to place the second horizontal base on top of the fixed frame in a first mode of operation of the cart, and move the second end downwards relative to the first end to place the second horizontal base adjacent to the first horizontal base in a second mode of operation of the cart.

According to at least one aspect of the present disclosure, provided is a cart for transporting objects, comprising a first storage section comprising a fixed frame, wherein the fixed frame comprising: a first horizontal base having a first storage surface and a first bottom surface; at least one wheeled assembly disposed at the first bottom surface of the first horizontal base; and at least two first uprights disposed at opposite ends on the first storage surface of the first horizontal base; a second storage section comprising at least one movable frame, wherein the at least one movable frame comprising: a second horizontal base having a second storage surface and a second bottom surface, and at least two second uprights disposed at opposite ends on the second horizontal base; and at least one support arm pivotally coupled to one of the at least two first uprights of the fixed frame at a first end of the at least one support arm and pivotally coupled to the second bottom surface of the at least one movable frame at a second end of the at least one support arm, wherein the at least one support arm is configured to: move the second end upwards relative to the first end to place the second horizontal base on top of the fixed frame in a first mode of operation of the cart; and move the second end downwards relative to the first end to place the second horizontal base vertically adjacent to the first horizontal base in a second mode of operation of the cart.

According to at least one aspect of the present disclosure, the cart further comprises at least one set of support arms, wherein the at least one set of support arms comprises: a first support arm pivotally coupled to a front face of the fixed frame at the first end and pivotally coupled to a front face of the at least one movable frame at the second end; and a second support arm pivotally coupled to a rear face of the fixed frame at the first end and pivotally coupled to a rear face of the at least one movable frame at the second end, wherein the second support arm is disposed parallel to the first support arm.

According to at least one aspect of the present disclosure, the cart further comprises one or more storage surfaces disposed above the first storage surface and one or more storage surfaces disposed above the second storage surface.

According to at least one aspect of the present disclosure, the cart further comprises two movable frames positioned at opposite sides of the fixed frame, wherein each of the two movable frames is pivotally coupled to the fixed frame through at least two supports arms.

According to at least one aspect of the present disclosure, moving the second end upwards relative to the first end comprises lifting the at least one movable frame, pivotally attached to the fixed frame through the at least one support arm, upwards relative to the fixed frame.

According to at least one aspect of the present disclosure, moving the second end downwards relative to the first end comprises positioning the at least one movable frame, pivotally attached to the fixed frame through the at least one support arm, adjacent to the fixed frame.

According to at least one aspect of the present disclosure, the fixed frame comprises a support bar extending from the first horizontal base for resting the at least one movable frame in the second mode of operation of the cart.

According to at least one aspect of the present disclosure, the cart further comprises one or more removable bins placed on at least one of the first storage surface or the second storage surface of the cart for receiving one or more objects.

According to at least one aspect of the present disclosure, the cart further comprises a mechanical expansion system configured to engage the at least one support arm for lifting the at least one movable frame.

According to at least one aspect of the present disclosure, the cart further comprises a lift assist mechanism, wherein the lift assist mechanism comprises: a first cable wire connected to the first horizontal base; a second cable wire connected to the second horizontal base; and an actuator connecting the first cable wire and the second cable wire.

According to at least one aspect of the present disclosure, a cart for transporting objects is provided. The cart comprises a first storage section comprising a fixed frame, wherein the fixed frame comprising: a first horizontal base having a first storage surface for receiving the objects, and at least two first uprights disposed at opposite ends of the first horizontal base; and a second storage section comprising a movable frame, wherein the movable frame comprising: a second horizontal base having a second storage surface for receiving the objects, and at least two second uprights disposed at opposite ends of the second horizontal base, wherein the at least two second uprights are slidably attached to the at least two first uprights, and are configured to cause a vertical movement of the movable frame by slidably moving along the at least two first uprights.

According to at least one aspect of the present disclosure, each of the at least two first uprights comprises a first outer rail extending along a length of a corresponding first upright; and each of the at least two second uprights comprises a first inner rail extendably coupled to a corresponding first outer rail of the at least two first uprights, wherein the corresponding first outer rail partially houses the first inner rail, wherein the first inner rail slides relative to the corresponding first outer rail to cause the vertical movement of the movable frame.

According to at least one aspect of the present disclosure, the cart further comprises an actuator disposed on one of the at least two first uprights and connects the fixed frame and the movable frame, wherein the actuator is configured to cause the first inner rail to slide relative to the corresponding first outer rail.

According to at least one aspect of the present disclosure, the fixed frame further comprises at least one second outer rail disposed horizontally above the first storage surface and connects two of the at least two first uprights, and the movable frame further comprises at least one second inner rail disposed on a bottom surface of the second horizontal base, wherein the at least one second inner rail is configured to cause a horizontal movement of the movable frame by slidably moving along the at least one second outer rail.

According to at least one aspect of the present disclosure, the cart further comprises one or more lock mechanisms disposed on the at least two first uprights to prevent the vertical movement of the movable frame.

According to at least one aspect of the present disclosure, the fixed frame further comprises at least one third outer rail disposed horizontally and connects two ends of the at least two first uprights, wherein the at least one third outer rail is above and parallel to the at least one second outer rail, and the movable frame further comprises at least one third inner rail disposed horizontally above the second horizontal base and connects two of the at least two second uprights, wherein the at least one third inner rail is configured to cause the horizontal movement of the movable frame by slidably moving along the at least one third outer rail.

According to at least one aspect of the present disclosure, the cart further comprises a first pulley secured on the first horizontal base; a second pulley secured on one of the at least one third outer rail; a third pulley secured on one of at least one second inner rail; a fourth pulley secured on one of the at least one third outer inner; a movable pulley connected to a lever, and a cable wire wrapping around the movable pulley, the first pulley, the second pulley, the third pulley, the fourth pulley, and the movable pulley, wherein a first end of the cable wire is secured on the first horizontal base and a second end of the cable wire is secured on the one of the at least one third inner rail.

According to at least one aspect of the present disclosure, the fixed frame further comprises at least one wheeled assembly disposed on a bottom surface of the first horizontal base.

According to at least one aspect of the present disclosure, the fixed frame comprises a support bar extending from the first horizontal base for resting the movable frame.

According to another aspect of the present disclosure, a rack for storing objects is provided. The rack may include a first storage section for receiving the objects, and a second storage section pivotally attached to the first storage section. The second storage section may be pivoted upwards relative to the first storage section to be positioned on top of the first storage section in a first mode of operation of the rack, and pivoted downwards relative to the position in the first mode of operation to be positioned adjacent to the first storage section in a second mode of operation of the rack.

According to another aspect of the present disclosure, the rack further comprises at least one support arm, wherein each of the at least one support arm is pivotally coupled to the first storage section at a first end of a corresponding support arm and pivotally coupled to one of the at least one second storage section at a second end of the corresponding support arm.

According to another aspect of the present disclosure, the at least one support arm is configured to: pivot the at least one second storage section upwards relative to the first storage section to the first position on top of the first storage section in the first mode of operation of the rack; and pivot the at least one second storage section downwards relative to the first position in the first mode of operation to the second position adjacent to the first storage section in the second mode of operation of the rack.

According to another aspect of the present disclosure, a cart for transporting objects is provided. The cart may include a first storage section having a fixed frame. The fixed frame may include a first horizontal base having a first storage surface for receiving the objects, a wheeled assembly disposed at a bottom of the first horizontal base, and two or more first uprights disposed at opposite ends of the first horizontal base. The cart may include a second storage section having a movable frame. The movable frame may include a second horizontal base having a second storage surface for receiving the objects, and a second upright slidably attached to one of the first uprights. The second upright may slidably move upwards along the first upright to position the second horizontal base on top of the fixed frame in a first mode of operation of the cart. Further, the second upright may slidably move downwards along the first upright to position the second horizontal base adjacent to the first horizontal base in a second mode of operation of the cart.

According to another aspect of the present disclosure, each of the at least two first uprights comprises a first outer rail extending along a length of a corresponding first upright; and each of the at least two second uprights comprises a first inner rail extendably coupled to a corresponding first outer rail of the at least two first uprights, wherein the corresponding first outer rail partially house the first inner rail, wherein the first inner rail slides relative to the corresponding first outer rail to move the at least two second uprights vertically along the at least two first uprights.

Accordingly to another aspect of the present disclosure, the cart further comprises an actuator disposed on one of the at least two first uprights and connects the fixed frame and one of the at least one movable frame, wherein the actuator is configured to cause the first inner rail slides relative to the corresponding first outer rail.

According to another aspect of the present disclosure, the cart further comprises a second outer rail disposed horizontally between free ends of the at least two first uprights; and a second inner rail disposed under the second horizontal base between the at least two second uprights, wherein the second inner rail is configured to engage the second outer rail such that the second inner rail slidably extends or retracts from the second outer rail to position the second horizontal base above or adjacent to the fixed frame.

According to another aspect of the present disclosure, the fixed frame comprises a support bar extending from the first horizontal base for resting the at least one movable frame in the second mode of operation of the cart.

According to another aspect of the present disclosure, the cart comprises a mechanical expansion system engaged to at least one of the at least two first uprights or the at least two second uprights for slidably moving the at least one movable frame.

According to another aspect of the present disclosure, the cart comprises one or more removable bins placed on at least one of the first storage surface or the second storage surface of the cart for receiving one or more objects.

According to another aspect of the present disclosure, a rack for storing objects is provided. The rack may include a first storage section for receiving the objects, and a second storage section slidably attached to the first storage section. The second storage section may slidably move upwards relative to the first storage section to be positioned on top of the first storage section in a first mode of operation of the rack, and slidably move downwards relative to the position in the first mode of operation to be positioned adjacent to the first storage section in a second mode of operation of the rack.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
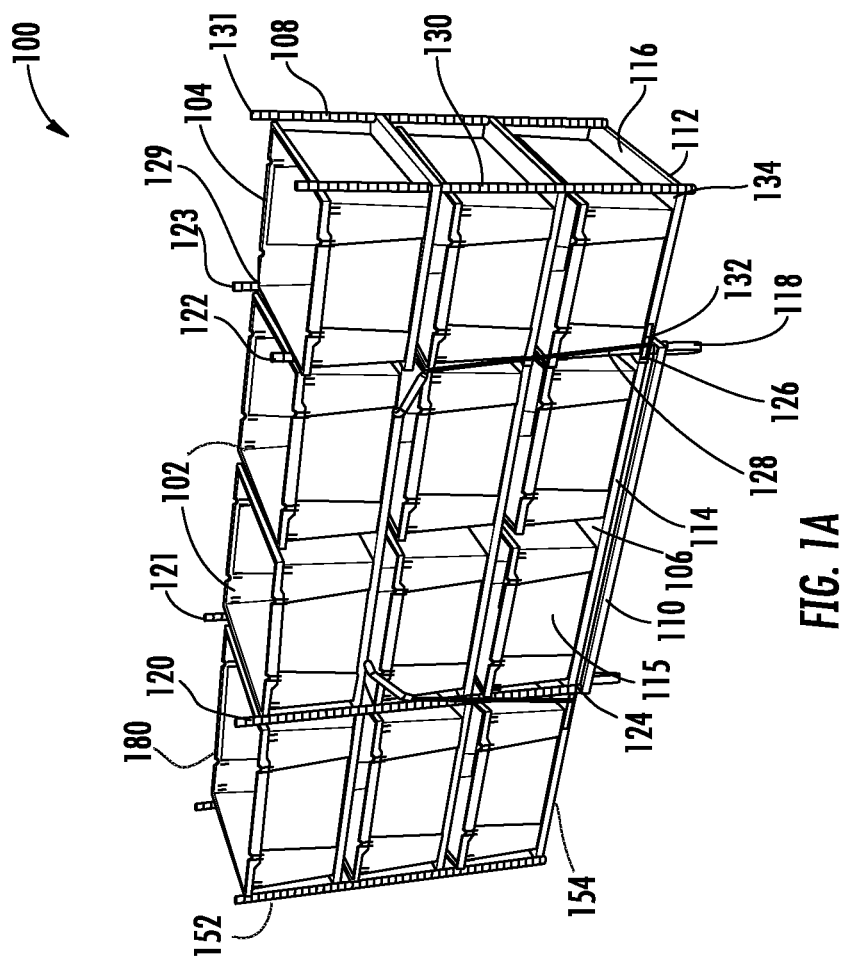
FIG. 1A illustrates an isometric view of a cart in a second mode of operation of the cart, according to one or more embodiments.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative," "exemplary" and "example" are used to be examples with no indication of quality level. Like numbers refer to like elements throughout.

In some embodiments of the present invention, a cart for transporting objects in a material handling environment is disclosed. The cart may have a first storage section having a fixed frame, and a second storage section having a movable frame. The second storage section is movable with respect to the first storage section, such that the second storage section may be positioned above the first storage section in a first mode of operation of the cart. The second storage section may be re-positioned horizontally adjacent to the first storage section in a second mode of operation of the cart. Thus, the cart may be configured in a tall-narrow configuration in a first mode of operation of the cart for storing and/or transporting, and in a low-wide configuration in a second mode of operation of the cart for loading and/or unloading by a human operator.

In some example implementations of embodiments of the present disclosure, the cart may have support arms for moving the second storage section relative to the first storage section. The support arm is coupled to the fixed frame at a pivot point at one end of the support arm, and to the movable frame at a pivot point at the other end of the support arm. The support arm may pivotally lift and move the movable frame upwards to be positioned on top of the fixed frame in the first mode of operation of the cart. The support arm may further pivotally move the movable frame downwards to be positioned horizontally adjacent to the fixed frame in the second mode of operation of the cart.

In some example implementations of embodiments of the present disclosure, the fixed frame may have two first uprights disposed at opposite end of a first horizontal base. Similarly, the movable frame may have two second uprights disposed at opposite end of a second horizontal base. The second uprights may be slidably attached to the adjacent first uprights. Further, the fixed frame may have outer rails disposed horizontally between the first uprights, and the movable frame may have inner rails disposed horizontally between the second uprights. In a first mode of operation of the cart, the second uprights and inner rails may slidably move the movable frame vertically and horizontally to position the movable frame on top of the fixed frame. In a second mode of operation of the cart, the second upright and inner rails may slidably move vertically and horizontally to position the movable frame horizontally adjacent to the fixed frame.

In some embodiments of the present invention, a rack for storing objects is disclosed. The rack may have a first storage section and a second storage section. The second storage section may be movable with respect to the first storage section, such that the second storage section may be positioned above the first storage section in a first mode of operation of the rack. The second storage section may be re-positioned horizontally adjacent to the first storage section in a second mode of operation of the rack. Thus, the rack may be configured in a tall-narrow configuration in a first mode of operation of the rack for storing and/or transporting, and in a low-wide configuration in a second mode of operation of the rack for loading and/or unloading by a human operator.

The components illustrated in the figures represent components that may or may not be present in various embodiments of the invention described herein such that embodiments may include fewer or more components than those shown in the figures while not departing from the scope of the invention.

Turning now to the Drawings, the detailed description set forth below in connection with the appended drawings is intended as a description of various configurations, and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

FIG. 1A illustrates a cart 100 for transporting objects based on some example embodiments of the present disclosure. The cart 100, as shown in FIG. 1A, is positioned in a low-wide configuration for a loading and/or unloading mode of operation. The cart 100 may have a first storage section 102, a second storage section 104, and a third storage section 180. According to some example implementations, as illustrated in FIG. 1A, the cart 100 may have four adjacent columns of shelves and/or storage surfaces for receiving objects. The middle two columns may form a first storage section 102, the column on one side of the first storage section 102 may form a second storage section 104, and the column on the other side of the first storage section 102 may form a third storage section 180. It is to be noted that the present disclosure is not limited to the above configuration, and may include various other embodiments. For example, two columns may form the first storage section 102 and two columns may form the second storage section 104, without a third storage section. As another example, three columns may form the first storage section 102 and one column may form the second storage section 104, without a third storage section.

As shown in FIG. 1A, the first storage section 102 may include a fixed frame 106. The fixed frame 106 includes a first horizontal base 110 having a first storage surface 114 for receiving objects for storage and/or transportation. The objects may be loaded directly on the first storage surface 114 and/or may be loaded in a container 115, such as a bin, tote, basket, and the like, placed on the first storage surface 114. The container 115 may be fixedly attached to the first storage surface 114 or may be removably placed on the first storage surface 114. The fixed frame 106 may further have a wheeled assembly 118 disposed at a bottom of the first horizontal base 110. The wheeled assembly 118 may include one or more wheels disposed under the first horizontal base 110 to enable the cart 100 to move on ground and/or on a conveyor rail. In the example embodiment, as partially shown in FIG. 1A, there are four wheels (including wheeled assembly 118) disposed under each corner of the first horizontal base 110. In some embodiments, the cart 100 may be pushed and/or pulled by a manual operator. In other embodiments, the cart 100 may be moved by a drive system (not shown in FIG. 1A) coupled to the wheeled assembly 118 for driving the cart 100.

The fixed frame 106 further includes first uprights 120 and 122, as shown in FIG. 1A. The first uprights 120 and 122 may be disposed at opposite ends 124 and 126 of the first horizontal base 110. In some embodiments, the fixed frame 106 may include more than two uprights, such as first uprights 121 and 123 disposed at the rear ends of the first horizontal base 110. The first uprights 120, 121, 122, 123 may be realized as vertical bars and/or rods for providing structural support and definition to the fixed frame 106. In some embodiments, the fixed frame 106 may include multiple storage surfaces defined by the first uprights 120, 121, 122, 123 and above the first horizontal base 110. For example, as shown in FIG. 1A, there are three levels of storage surfaces in the first storage section 102.

Further, the second storage section 104 includes movable frame 108. The movable frame 108 may have a second horizontal base 112 having a second storage surface 116 for receiving objects for storage and/or transportation. The movable frame 108 further includes second uprights 128 and 130, as shown in FIG. 1A. The second uprights 128 and 130 may be disposed at opposite ends 132 and 134 of the second horizontal base 112. In some embodiments, the movable frame 108 includes more than two uprights, such as second uprights 129 and 131 disposed at the rear ends of the second horizontal base 112. The second uprights 128, 129, 130, 131 may be realized as vertical bars and/or rods for providing structural support and definition to the movable frame 108. In some embodiments, the movable frame 108 may include multiple storage surfaces disposed between the second uprights 128, 129, 130, 131 and above the second horizontal base 112. Further, in some embodiments, as shown in FIG. 1A, the second upright 128 is adjacent to the first upright 122, and the second upright 130 is on the outer end 134 of the movable frame 108. The fixed frame 106 may further include a support bar (not shown in FIG. 1A), such as a ledge, extending horizontally from the first horizontal base 110, such that the movable frame 108 may rest on the support bar. The support bar provides additional support to the movable frame 108 in the low-wide configuration of the cart 100.

Similar to the second storage section 104, the third storage section 180 includes the movable frame 152 and the horizontal base 154. The horizontal base 154 has a storage surface for receiving objects for storage and/or transportation. The movable frame 152 further includes uprights as shown in FIG. 1A.

In various embodiments, the cart 100 further includes support arms for pivotally moving the movable frame 108 relative to the fixed frame 106. The support arms are shown in FIG. 1B.

Figure 1B:
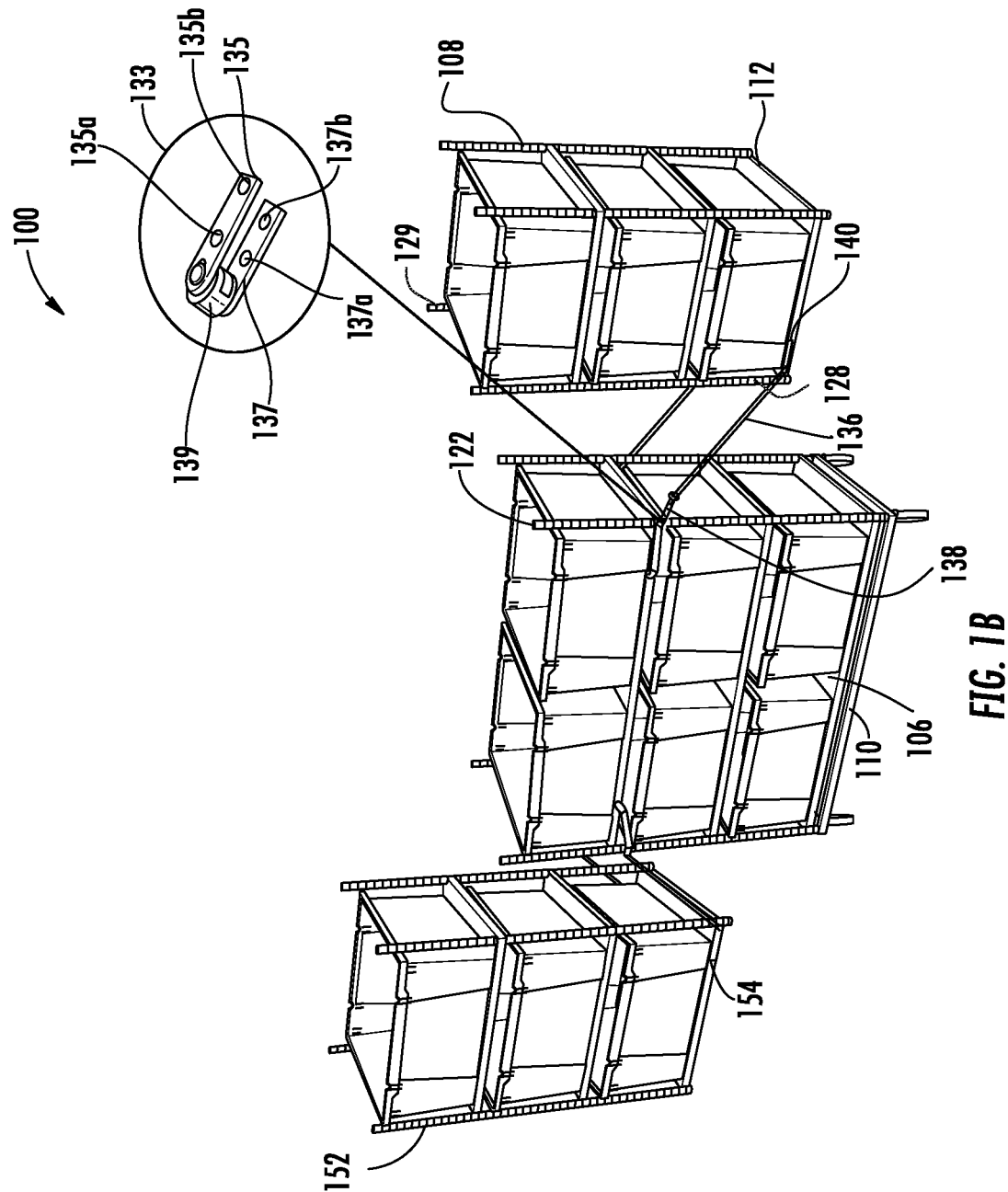
FIG. 1B illustrates an isometric view of a cart in an intermediate position, according to one or more embodiments.
Figure 1C:
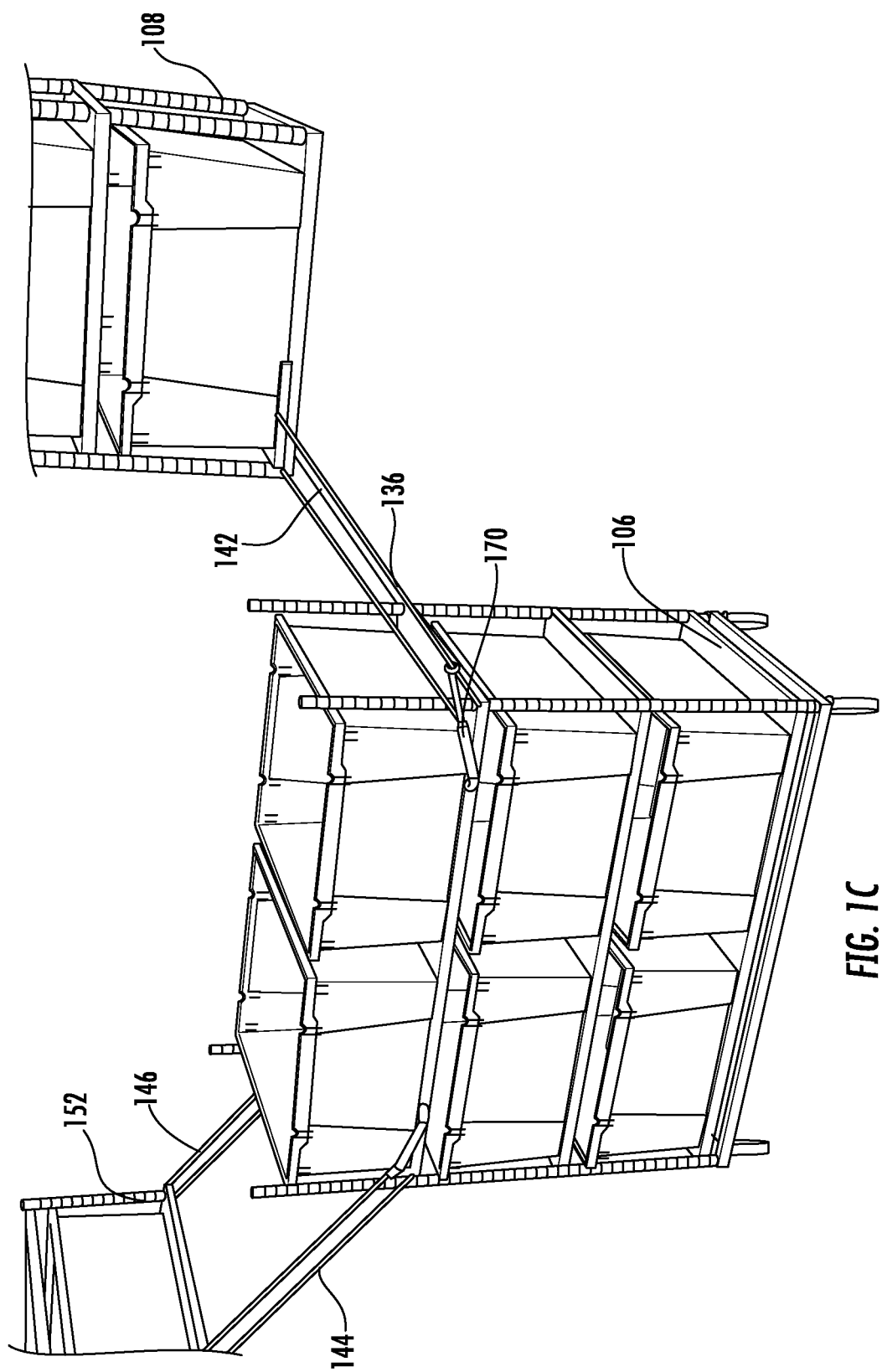
FIG. 1C illustrates an isometric view of a cart in another intermediate position, according to one or more embodiments.

FIGS. 1B and 1C illustrate the cart 100 in intermediate positions while transforming from one configuration to another in accordance with some example embodiments of the present disclosure. The cart 100, as shown in FIG. 1B, may include a support arm 136 having a first end 138 and a second end 140. The first end 138 of the support arm 136 is pivotally coupled to the fixed frame 106, and the second end 140 of the support arm 136 is pivotally coupled to the movable frame 108. In some example embodiments, the first end 138 of the support arm 136 is coupled to the first upright 122 of the fixed frame 106, and the second end 140 of the support arm 136 is coupled to the second horizontal base 112 of the movable frame 108. The first end 138 may be coupled to the first upright 122 through a pivot joint on the first upright 122, such as, the pivot connector 133, as shown in FIG. 1B. The pivot connector 133 may have a first edge 135 having holes 135a and 135b, and a second edge 137 having holes 137a and 137b. The edges 135 and 137 may be coupled through a pivot pin 139. The pivot pin 139 facilitates a freedom of motion between the two edges 135 and 137, such that when one edge, for example edge 137 is fixed, the other edge 135 may be rotatable relative to the fixed edge 137. In some example embodiments, the edge 137 of the pivot connector 133 may be attached to the first upright 122 through one or more screws passing through the holes 137a and 137b to the first upright 122. The other edge 135 of the pivot connector 133 may be attached to the first end 138 of the support arm 136 through one or more screws passing through the holes 135a and 135b to the support arm 136. Thus, the support arm 136 may be pivotally rotatable relative to the first upright 122 through the pivot connector 133. Similarly, a second pivot connector may be used to pivotally couple the second end 140 of the support arm 136 to the movable frame 108. The support arm 136 may further be pivotally rotatable relative to the movable frame 108 through the pivot connector. In some other embodiments, a different pivot connector may be used.

In an embodiment, the cart 100 further includes mechanical expansion system 170, such as, but not limited to, gas shock cylinder, to provide an assistance to the human operator for moving the movable frames 108 and 152. The mechanical expansion system 170 may be engaged to the support arm 136, for automatically lifting the movable frame 108.

In accordance with an exemplary embodiment, the cart 100 may have multiple support arms, such as, support arms 142, 144, and 146, as shown in FIGS. 1B and 1C. The support arms 136 and 142 may be pivotally coupled to opposite ends of a front face of the fixed frame 106, as shown in FIGS. 1B and 1C. The support arms 144 and 146 may be pivotally coupled to opposite ends of a rear face of the fixed frame 106, as shown in FIGS. 1B and 1C. In some embodiments, the support arms 142, 144, and 146 may use the pivot connector described above to connect to the corresponding fixed frame. The other ends of the support arms 136 and 142 may be pivotally coupled to a front face of the movable frames 108 and 152, and the other ends of the support arms 144 and 146 may be pivotally coupled to a rear face of the movable frames 108 and 152. Further, as shown in FIGS. 1B and 1C, the movable frames 108 and 152 may be pivotally movable relative to the fixed frame 106. Specifically, the second end 140 of the support arm 136 may move upwards relative to the first end 138, thus lifting the movable frame 108 upwards. In accordance with the above embodiment, the support arms 136 and 142 may move together and lift the movable frame 108 upwards. Similarly, the support arms 144 and 146 may move together and lift the movable frame 152 upwards, to reconfigure the cart 100 in a tall-narrow configuration for a storing and/or transport mode of operation of the cart 100. The final configuration of the cart 100 in the storing and/or transport mode of operation is shown in FIG. 1D.

Figure 1D:
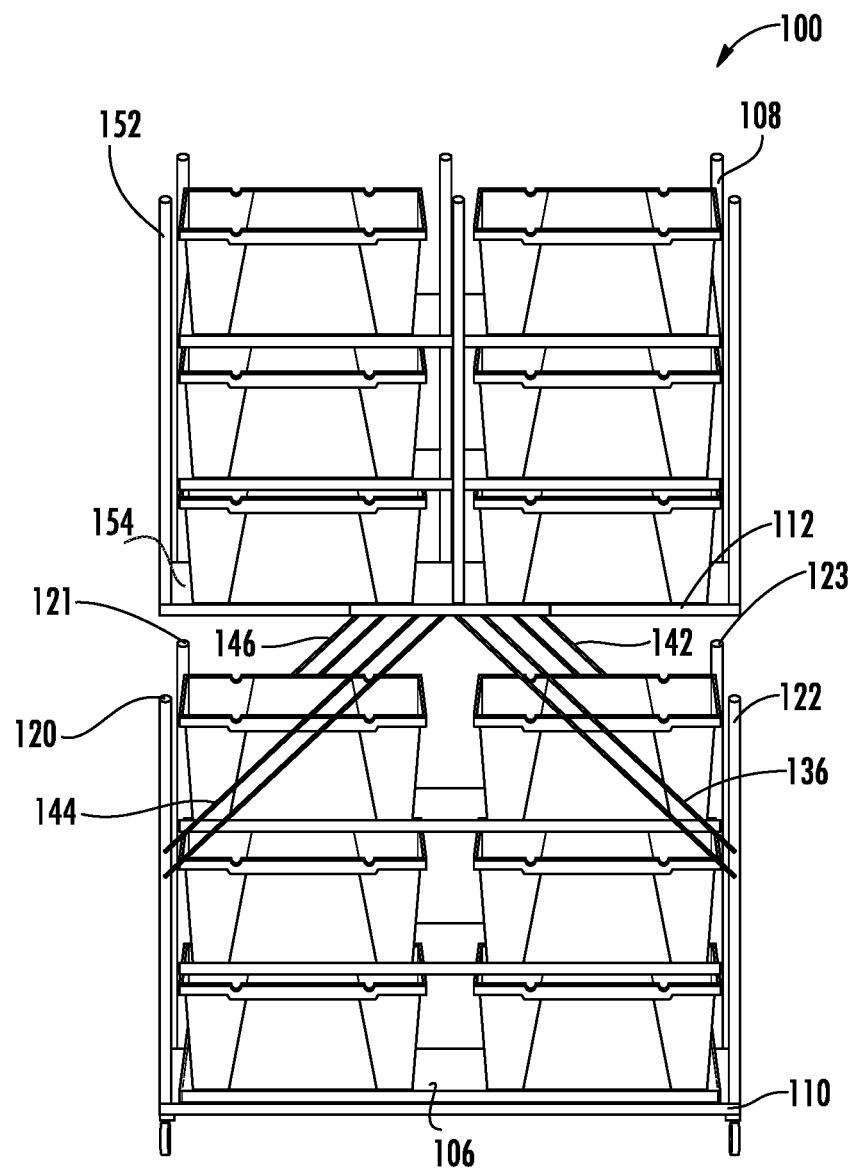
FIG. 1D illustrates an isometric view of a cart in a first mode of operation of the cart, according to one or more embodiments.

FIG. 1D illustrates a cart 100 for transporting objects based on some example embodiments of the present disclosure. The cart 100, as shown in FIG. 1D, is positioned in a tall-narrow configuration for a storage and/or transportation mode of operation. As described above, the movable frames 108 and 152 may be pivotally moved upwards relative to the fixed frame 106 through the support arms 136, 142, 144, and 146. Further, the support arms 136, 142, 144, and 146 may be further rotated such that the support arms 136 and 144 pivotally move towards each other, and support arms 142 and 146 pivotally move towards each other, resulting positioning the movable frames 108 and 152 on top of the fixed frame 106, as shown in FIG. 1D. In an exemplary embodiment, the second horizontal base 112 of the movable frame 108 may rest on the first uprights 120 and 121, and the second horizontal base 154 of the movable frame 152 may rest on the first uprights 122 and 123, while being supported by the support arms 136, 142, 144, and 146. In another embodiment, the movable frames 108 and 152 may be positioned on a storage surface of the fixed frame 106. In some embodiments, a portion of the first uprights 120, 121, 122, 123 may extend vertically above the second horizontal base 112 or the third horizontal base 154 when the movable frames 108 and 152 are positioned on top of the fixed frame 106. The extended portion of the first uprights 120, 121, 122, 123 hold the movable frames 108 and 152 in place and prevent the movable frames 108 and 152 from slipping away when the cart 100 is moved. Additionally and/or alternatively, the cart 100 may have a support structure (not shown), such as a ledge, extending upwards from the fixed frame 106 for the above mentioned purpose.

Thus, the cart 100 as described in FIGS. 1A-1D, may be configured in a first mode of operation by pivotally moving the support arms 136, 142, 144, 146 to lift and position the movable frames 108 and 152 on top of the fixed frame 106. In the first mode of operation, the cart 100 may be transported in a transportation vehicle or vessel without incurring overhead space wastage and while reducing cubic space occupied within the transport vessel. Further, the cart 100 may be reconfigured to operate in a second mode of operation by pivotally moving the support arms 136, 142, 144, 146 to move the movable frames 108 and 152 downwards to be positioned adjacent to the fixed frame 106 on both sides of the fixed frame 106. In the second mode of operation, the cart 100 may be used by a human operator to load and/or unload objects. Since the movable frames 108 and 152 are positioned adjacent to the fixed frame 106 in the second mode of operation, the overall height of the cart 100 may be reduced and all sections of the cart 100 may be accessible to the human operator.

Figure 2B:
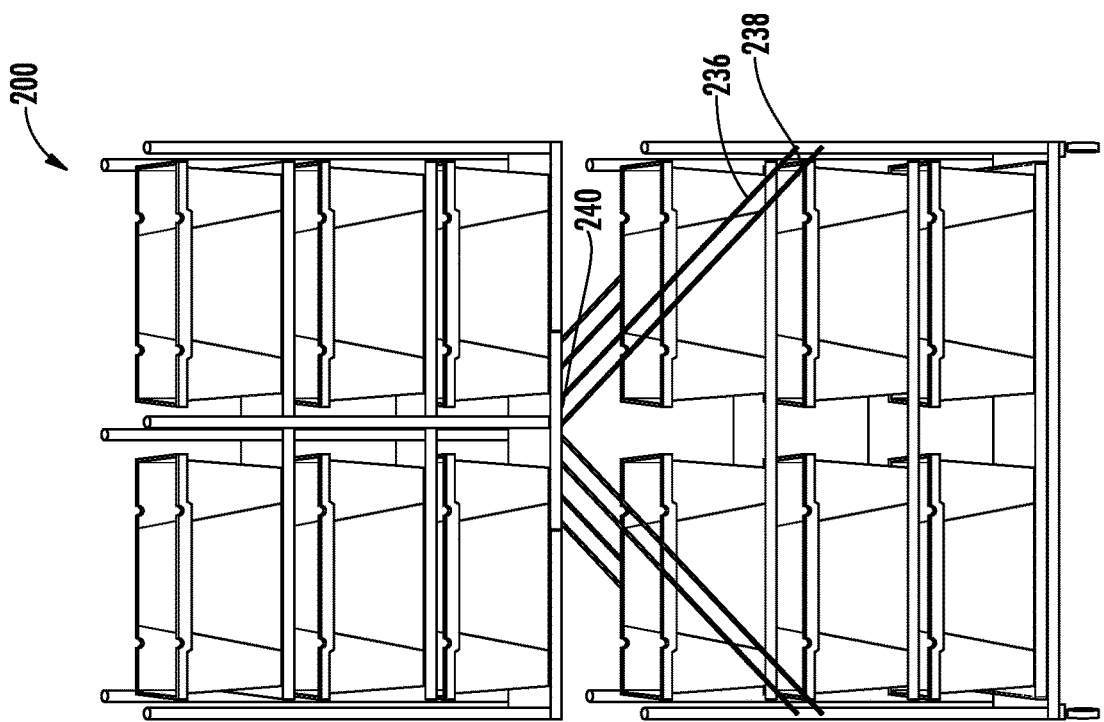
FIG. 2B illustrates an isometric view of a rack in a first mode of operation of the rack, according to one or more embodiments.
Figure 2A:
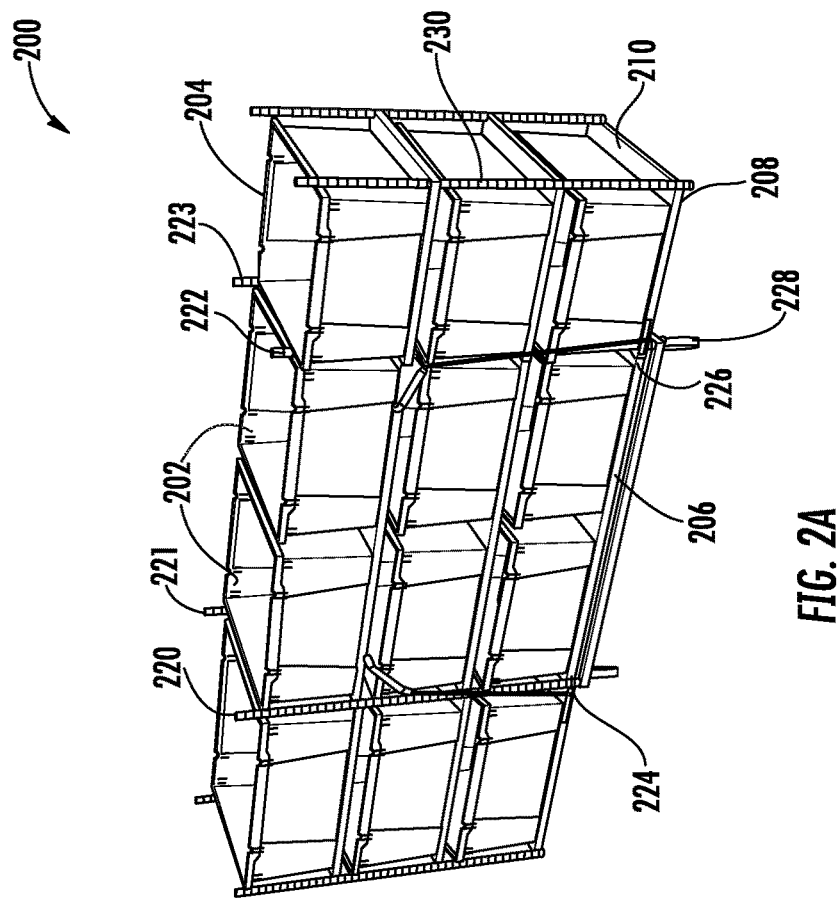
FIG. 2A illustrates an isometric view of a rack in a second mode of operation of the rack, according to one or more embodiments.

FIGS. 2A-2B illustrate a rack 200 for storing objects based on some example embodiments of the present disclosure. The rack 200 may be reconfigurable in a similar manner as the cart 100 described above with reference to FIG. 1. However, the rack 200 may be used for storing objects in a warehouse, rather than for transporting objects. Thus, the rack 200 might not require a wheeled assembly as described above for cart 100, but instead uses a base assembly 228. The rack 200, as shown in FIG. 2A, is positioned in a low-wide configuration for a loading and/or unloading mode of operation. The rack 200, as shown in FIG. 2B, is positioned in a tall-narrow configuration for a storage and/or transport mode of operation.

The rack 200 may have a first storage section 202 and a second storage section 204. The first storage section 202 may further include first uprights 220 and 222, as shown in FIG. 2A. The first uprights 220 and 222 may be disposed at opposite ends 224 and 226 of a first horizontal base 206. In some embodiments, the first storage section 202 may include more than two uprights, such as first uprights 222 and 223 disposed at the rear ends of the first horizontal base 206. In some embodiments, the first storage section 202 may include multiple storage surfaces defined by the first uprights 220, 221, 222, 223 and above the first horizontal base 206. For example, as shown in FIG. 2A, there are three levels of storage surfaces. Further, the second storage section 204 may have a second horizontal base 208 having a second storage surface 210 for receiving objects for storage. The second storage section 204 has uprights, such as upright 230.

The rack 200 may further include a support arm 236 having a first end 238 and a second end 240. The first end 238 of the support arm 236 may be pivotally coupled to the first storage section 202, and the second end 240 of the support arm 236 may be pivotally coupled to the second storage section 204 through a pivot connector, as described above. The support arm 236 may be pivotally rotatable relative to the first storage section 202 through the pivot connector. Similarly, a second pivot connector is used to pivotally couple the second end 240 of the support arm 236 to the second storage section 204. The support arm 236 may further be pivotally rotatable relative to the second storage section 204 through the pivot connector.

Thus, the rack 200 as described in FIGS. 2A-2B, may be configured in a first mode of operation by pivotally moving the support arms to lift and position the second storage section 204 on top of the first storage section 202. In the first mode of operation, the rack 200 may be transported in a transportation vehicle or vessel without incurring overhead space wastage and while reducing cubic space occupied within the transport vessel. Further, the rack 200 may be reconfigured to operate in a second mode of operation by pivotally moving the support arms to move the second storage section 204 downwards to be positioned vertically adjacent to the first storage section 202 on both sides of the first storage section 202. In the second mode of operation, the rack 200 may be used by a human operator to load and/or unload objects.

Figure 3A:
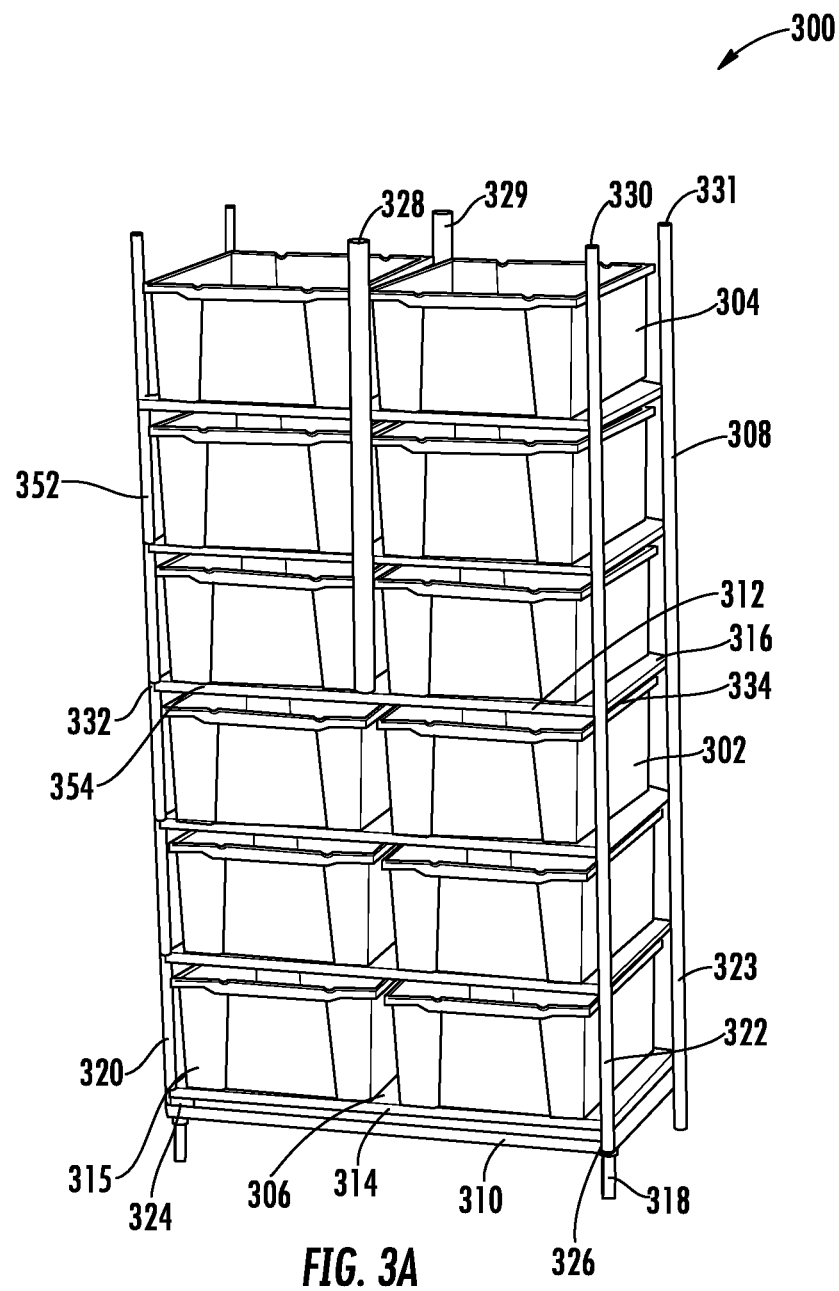
FIG. 3A illustrates an isometric view of a cart in a first mode of operation of the cart, according to one or more embodiments.
Figure 3B:
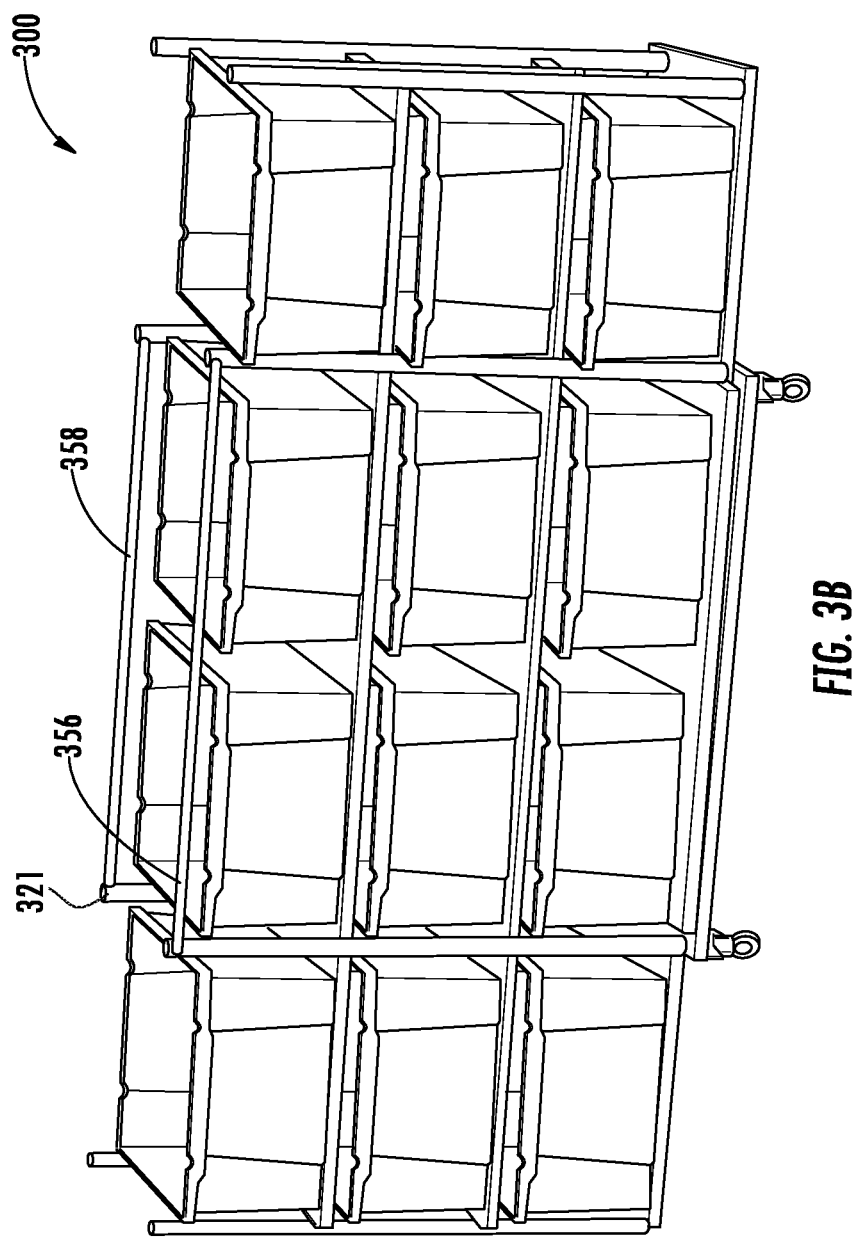
FIG. 3B illustrates an isometric view of a cart in a second mode of operation of the cart, according to one or more embodiments.

FIGS. 3A-3B illustrate a cart 300 for transporting objects based on some example embodiments of the present disclosure. The cart 300, as shown in FIG. 3A, is positioned in a tall-narrow configuration for a storage and/or transportation mode of operation. The cart 300 may have a first storage section 302 and a second storage section 304. The first storage section 302 may include a fixed frame 306. The fixed frame 306 may have a first horizontal base 310 having a first storage surface 314 for receiving objects. The fixed frame 306 may further have a wheeled assembly 318 disposed at a bottom of the first horizontal base 310. The wheeled assembly 318 may include one or more wheels disposed under the first horizontal base 310 to enable the cart 300 to move on ground and/or on a conveyor rail. In the example embodiment, as shown in FIG. 3A, the wheeled assembly 318 has four wheels disposed under each corner of the first horizontal base 310. The fixed frame 306 may further include first uprights 320 and 322, as shown in FIG. 3A. The first uprights 320 and 322 may be disposed at opposite ends 324 and 326 of the first horizontal base 310. In some embodiments, the fixed frame 306 may include more than two uprights, such as first uprights 321 and 323 disposed at the rear ends of the first horizontal base 310. The first uprights 320, 321, 322, 323 may be realized as vertical bars and/or rods for providing structural support and definition to the fixed frame 306. In some embodiments, the fixed frame 306 may include multiple storage surfaces disposed between the first uprights 320, 321, 322, 323 and above the first horizontal base 310 for storing objects. The objects may be loaded directly on the first storage surface 314 and/or may be loaded in a container 315, such as a bin, tote, basket, and the like, placed on the first storage surface 314.

Further, the second storage section 304 may include one or more movable frames 308 and 352. The movable frame 308 may have a second horizontal base 312 with an end 334 and having a second storage surface 316 for receiving objects for storage and/or transportation. The movable frame 352 may have a second horizontal base 354 with an end 332, as shown in FIG. 3A. The movable frame 308 may further include second uprights 328, 329, 330, 331, as shown in FIG. 3A. The second uprights 328, 329, 330, 331 may be disposed at corners of the second horizontal base 312.

Further, the cart 300, as shown in FIG. 3B, is positioned in a low-wide configuration for a loading and/or unloading mode of operation. As shown in FIG. 3B, the fixed frame 306 may have an outer rail 356 disposed horizontally between first uprights 320 and 322, and an outer rail 358 disposed horizontally between first uprights 321 and 323. In an embodiment, the second horizontal bases 312 and 354 of the movable frames 308 and 352 rest on the outer rails 356 and 358 in the tall-narrow configuration of the cart 300, as shown in FIG. 3A. The outer rails 356 and 358 will be described in detail with reference to FIG. 4.

Figure 4:
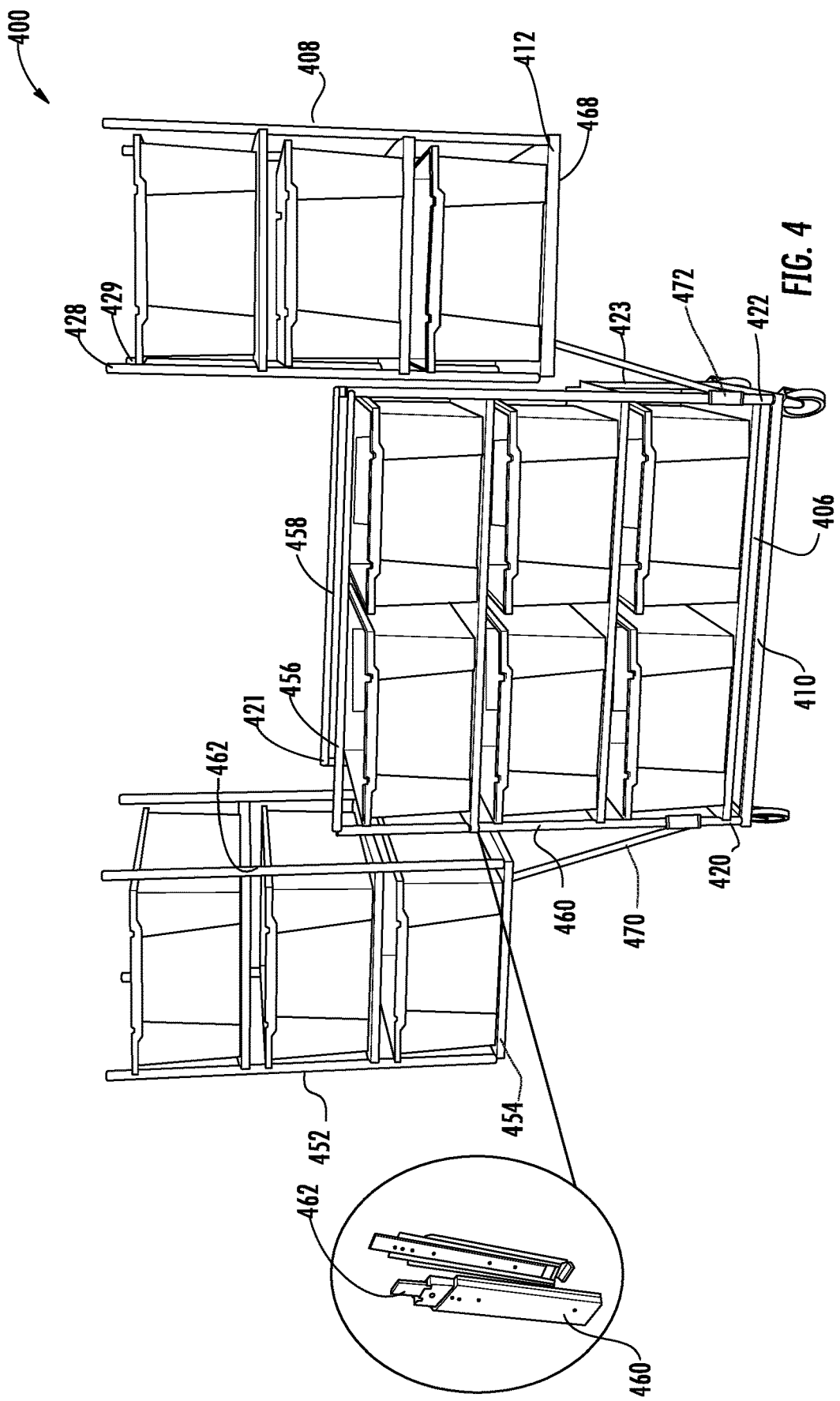
FIG. 4 illustrates an isometric view of a cart in an intermediate position, according to one or more embodiments.

FIG. 4 illustrates the cart 400 in an intermediate position between the low-wide configuration and the tall-narrow configuration based on some example embodiments of the present disclosure. The movable frames 408 and 452, as described above, may be slidably movable along the first uprights 422, 423 and 420, 421 respectively, in an upward direction and/or a downward direction relative to the fixed frame 406. In this regard, the first upright 422 may have an outer rail 460 vertically disposed along the length of the first upright 422. Further, an inner rail 462 may be engageable to be slidably coupled to the outer rail 460 and may be partially housed within the outer rail 460. The outer rail 460 may have slightly curved edges to retain the inner rail 462 while allowing the inner rail 462 to slidably move along the outer rail 460. The inner rail 462 may be fixedly attached to the second upright 428, along a length of the second upright 428. Similarly, each first upright of the fixed frame 406 and second uprights of the movable frame 408 that are adjacent to the first uprights may have an outer and an inner rail disposed thereon. Thus, the inner rail 462 coupled to the second upright 428 and an inner rail (not shown) coupled to the second upright 429 may slidably move upwards within the outer rails, thus lifting the movable frame 108 upwards relative to the fixed frame 406. Similarly, movable frame 452 may be slidably moved upwards relative to the fixed frame 406.

As described above, the fixed frame 406 may also include the outer rail 456 disposed horizontally between first uprights 420 and 422, and the outer rail 458 disposed horizontally between first uprights 421 and 423. The movable frame 408 may include an inner rail 468 disposed horizontally under the second horizontal base 412, such that the inner rail 468 may be engageable to the outer rail 456 and slidable horizontally along the outer rail 456 to position the movable frame 408 on top of the fixed frame 406 in a tall-narrow mode of operation of the cart 400. Similarly, the movable frame 408 may include another inner rail (not shown) disposed horizontally under the second horizontal base 412, such that the inner rail may be engageable to the outer rail 458 and slidable horizontally along the outer rail 458. The movable frame 452 may also include two inner rails (not shown) disposed horizontally under the second horizontal base 454, such that the inner rails may be engageable to the outer rails 456 and 458 and slidable horizontally along the outer rails 456 and 458.

In some embodiments, the cart 400 may include actuators to provide automatic configuration from one mode to another, such as using actuators 470 and 472 as shown in FIG. 4. For example, actuator 470 is connected to the movable frame 452, and is configured to cause the movable frame 452 to slide vertically along the outer rails disposed on the first uprights 420 and 421 (such as outer rail 460). In some embodiments, actuator 470 is further configured to cause the movable frame 452 to slide horizontally along the outer rails 458 and 456. Similarly, the actuator 472 is connected to the movable frame 408, and is configured to cause the movable frame 408 to slide vertically along the outer rails disposed on the first uprights 422 and 423. In some embodiments, the actuator 470 is configured to cause the movable frame 452 to slide horizontally along the outer rails 458 and 456. When a user wants to adjust the cart 400 from a tall-narrow mode of operation to a low-wide mode (and vice versa), the use may control the actuators 470 and 472 to achieve the automatic configuration of the cart 400.

In some embodiments, the cart 400 may include other mechanical expansion systems, such as, but not limited to, gas shock, to provide an assistance to the human operator for moving the movable frames 408 and 452. The mechanical expansion system may be engaged to the outer rail 460 and/or the inner rail 462, for automatically lifting the movable frame 408.

Thus, the cart 400, as described above with reference to FIG. 4, may be configured in a first mode of operation by slidably moving the second upright 428 upwards along the first upright 422 to move the movable frame 408 upwards relative to the fixed frame 406. Once the lowermost end of the second upright 428 is in contact with the uppermost end of the first upright 422, that is, the movable frame 408 is above the fixed frame 406, the inner rail 468 under the second horizontal base 412 may engage with the outer rail 456. Once the inner rail 468 is engaged with the outer rail 456, the movable frame 408 may slide horizontally towards the fixed frame 406. Thus, positioning the movable frame 408 on top of the fixed frame 406. Similarly, the movable frame 452 may be positioned on top of the fixed frame 406. One such example is shown in FIG. 3A. In the first mode of operation, the cart 400 may be transported in a transportation vehicle or vessel without incurring overhead space wastage and while reducing cubic space occupied within the transport vessel.

Further, the cart 400 may be reconfigured to operate in a second mode of operation by horizontally sliding the movable frames 408 and 452 away from the fixed frame 406, and then engaging the inner rail 462 disposed on second upright 428 with the outer rail 460 disposed on the first upright 422. Once engaged, the second upright 428 may slidably move downwards along the first upright 422 to position the second horizontal base 412 adjacent to the first horizontal base 410. Similarly, movable frame 452 may be slidably moved downwards to be positioned adjacent to the fixed frame 406. One such example is shown in FIG. 3B. In the second mode of operation, the overall height of the cart 400 may be reduced and all sections of the cart 400 may be accessible to a human operator.

Figure 5A:
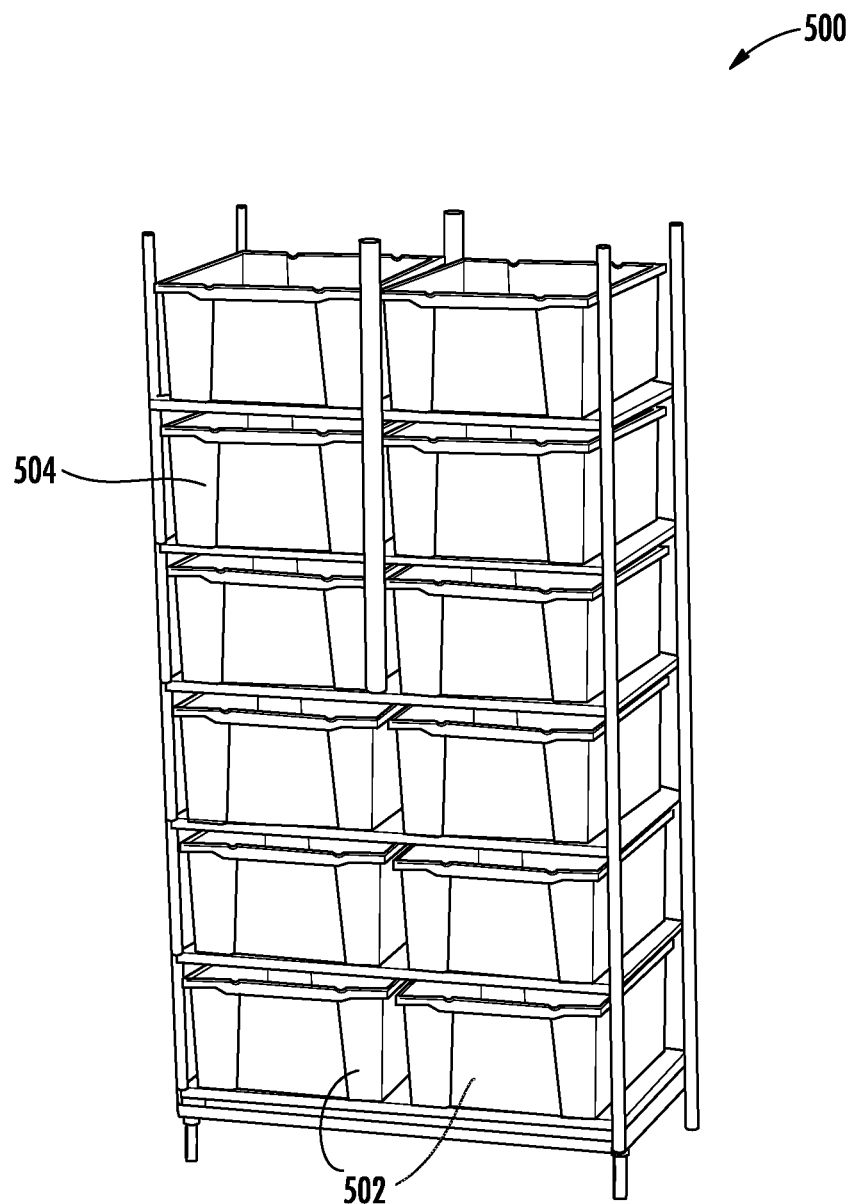
FIG. 5A illustrates an isometric view of a rack in a first mode of operation of the rack, according to one or more embodiments.
Figure 5B:
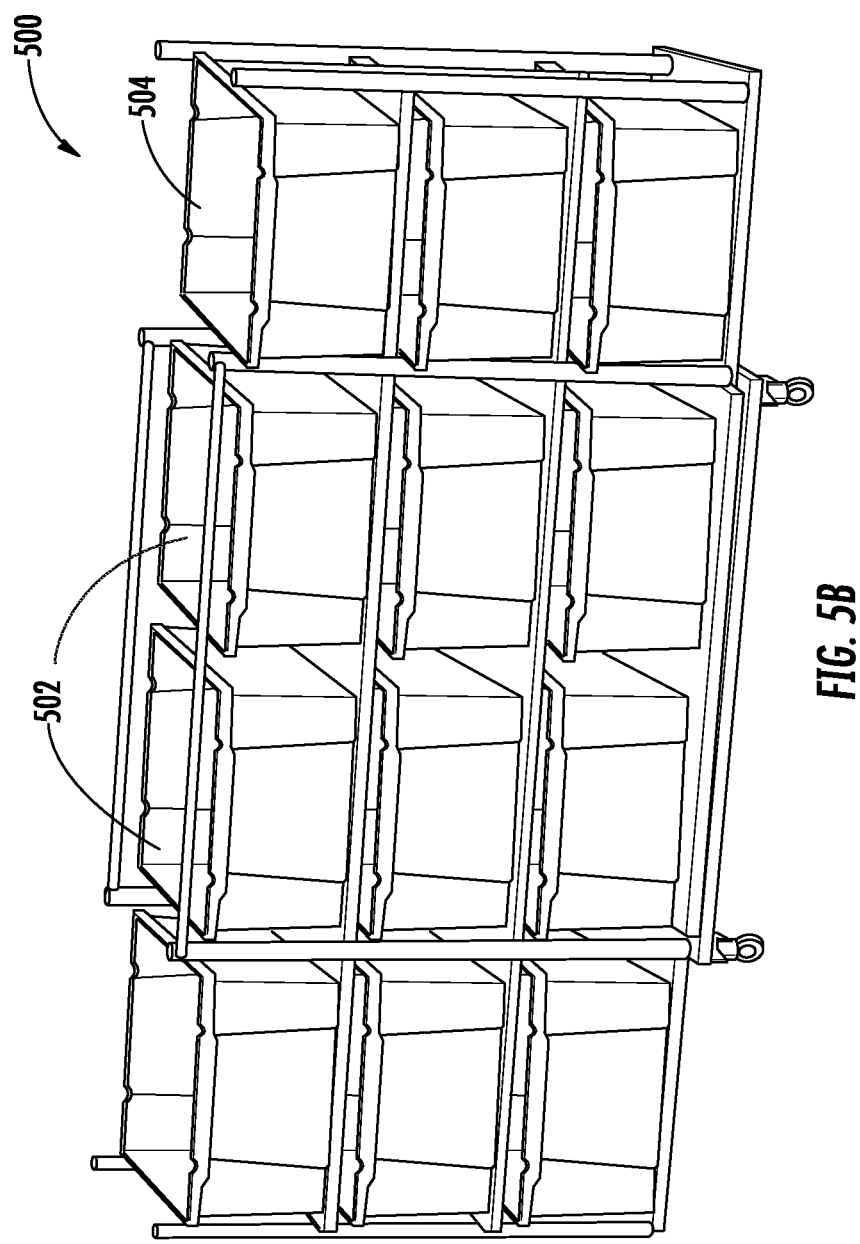
FIG. 5B illustrates an isometric view of a rack in a second mode of operation of the rack, according to one or more embodiments.

FIGS. 5A-5B illustrate a rack 500 for storing objects based some example embodiments of the present disclosure. The rack 500 may be reconfigurable in a similar manner as the cart 300 or 400 described above with reference to FIGS. 3A, 3B, and 4. However, the rack 500 may be used for storing objects in a warehouse, rather than for transporting objects. Thus, the rack 500 might not require a wheeled assembly, as described above for cart 100. The rack 500, as shown in FIG. 5A, is positioned in a tall-narrow configuration for a storage and/or transport mode of operation. Further, the rack 500, as shown in FIG. 5B, is positioned in a low-wide configuration for a loading and/or unloading mode of operation.

The rack 500 may have a first storage section 502 and a second storage section 504. The second storage section 504 may be slidably coupled to the first storage section 502, such that the second storage section 504 may slidably move upwards relative to the first storage section 502 to be positioned on top of the first storage section 502 in a first mode of operation of the rack 500. The second storage section 504 may slidably move downwards relative to the position in the first mode to be positioned adjacent to the first storage section 502 in a second mode of operation of the rack 500. In the first mode of operation, the rack 500 may be transported in a transportation vehicle or vessel without incurring overhead space wastage and while reducing cubic space occupied within the transport vessel. In the second mode of operation, the rack 500 may be used by a human operator to load and/or unload objects.

Figure 6A:
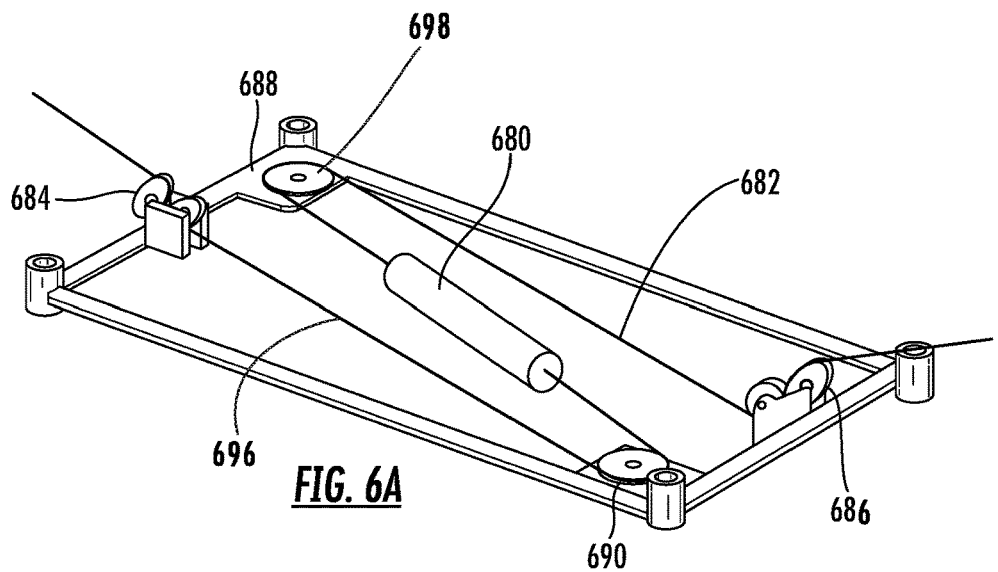
FIGS. 6A-6C illustrate various components of a cart with lift assistant mechanism in accordance with various embodiments of the present invention.
Figure 6B:
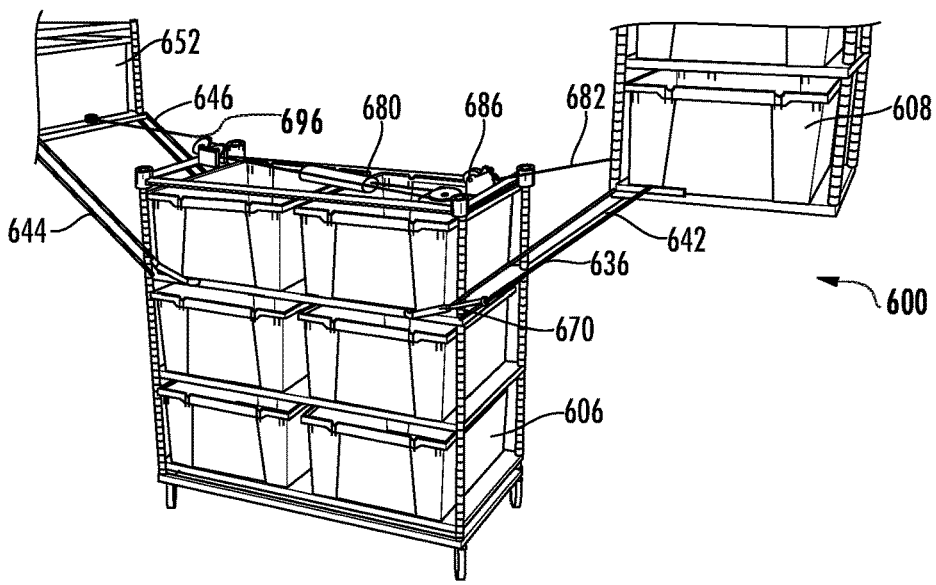
Figure 6C:
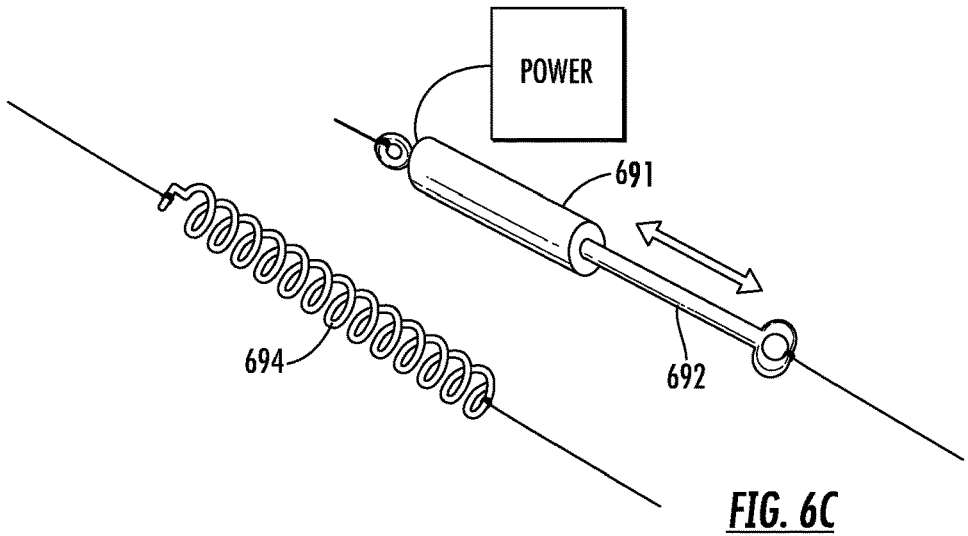

FIGS. 6A-6C illustrate various components of a cart with a lift assist mechanism in accordance with embodiments of the present invention.

Referring now to FIG. 6A, the lift assist mechanism 680 connects the cable wires 682 and 696. The cable wire 682 wraps around the pulley 698 and the pulley 686. The cable wire 696 wraps around the pulley 690 and the pulley 684. As shown in FIG. 6A, pulley 698, pulley 680, pulley 690, and pulley 684 are mounted on the plate 688. In some embodiments, the pulley 698 and the pulley 690 are diagonally from each other on the plate 688, and the pulley 684 and the pulley 686 are positioned diagonally from each other on the plate 688.

FIG. 6B shows a cart implementing the lift assist mechanism as shown in FIG. 6A. Similar to the cart 100 as shown in FIGS. 1A-1D, the cart 600 in FIG. 6B includes movable frames 608 and 652. The cart 600 may have multiple support arms, such as support arms 636, 642, 644, and 646 as shown in FIG. 6B. The support arms 636 and 642 may be pivotally coupled to opposite ends of a front face of the fixed frame 606. The support arms 636 and 642 may be pivotally coupled to opposite ends of a rear face of the fixed frame 606. The movable frames 608 and 652 may be pivotally movable relative to the fixed frame 606. Specifically, the end of the support arm 636 connected to the fixed frame 606 may move upwards relative to the other of the support arm 636 connected to the movable frame 608, thus lifting the movable frame 608 upwards. In accordance with the above embodiment, the support arms 636 and 642 may move together and lift the movable frame 608 upwards. Similarly, the support arms 644 and 646 may move together and lift the movable frame 652 upwards, to reconfigure the cart 600 to a tall-narrow configuration from a low-wide configuration.

To facilitate the reconfiguration, the plate 688 is mounted on top of the fixed frame 606. The cable wire 696 is connected to the movable frame 652, and the cable wire 682 is connected to the movable frame 608. To reconfigure the cart 600 to a tall-narrow configuration from a low-wide configuration, the lift assist mechanism 680 retracts the cable wires 682 and 696, causing the movable frames 652 and 608 to be pulled upwards. To reconfigure the cart 600 to a low-wide configuration from a tall-narrow configuration, the lift assist mechanism 680 releases the cable wires 682 and 696, causing the movable frames 652 and 608 to be dropped downwards.

Referring now to FIG. 6C, some embodiments of the lift assist mechanism 680 are shown. In some embodiments, the lift assist mechanism 680 includes an actuator, which includes a actuator body 691 and a piston rod 692. Each of the actuator body 691 and the piston rod 692 is connected to one of the cable wires 682 and 696. In these embodiments, a power may be supplied to the actuator to cause the linear movement of the piston rod 692. The actuator may be a hydraulic actuator, an electric actuator, a pneumatic actuator, a lead screw, or the like.

Figure 7:
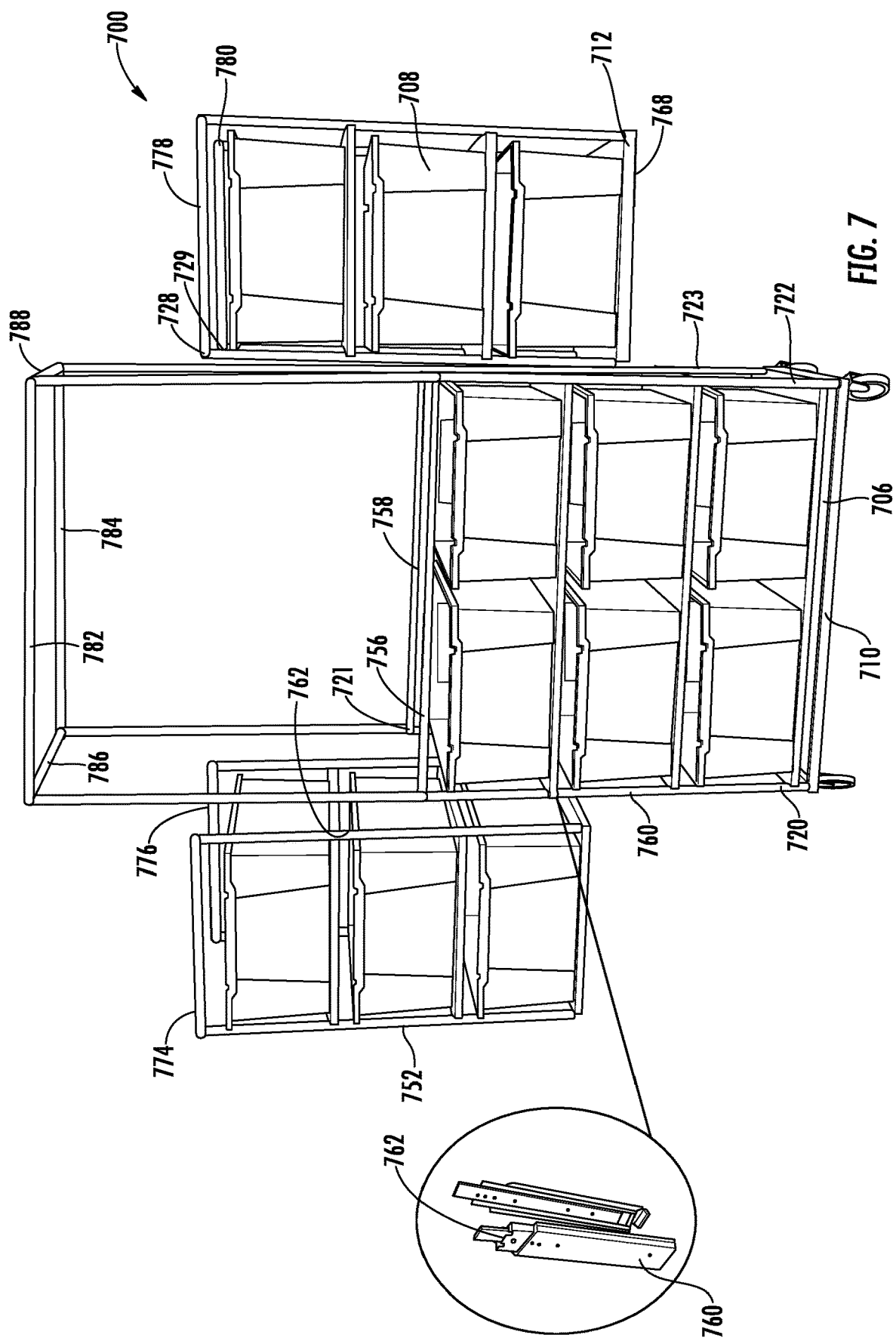
FIG. 7 illustrates an isometric view of a cart according to one or more embodiments.

FIG. 7 illustrates a cart 700 in accordance with some embodiments of the present invention. The movable frame 708 (similar to the movable frame 408 described above with reference to FIG. 4) may be slidably movable along the first uprights 722 and 723 in an upward direction and/or a downward direction relative to the fixed frame 706. The movable frame 752 (similar to the movable frame 485 described above with reference to FIG. 4) may be slidably movable along the first uprights 720 and 721 in an upward direction and/or a downward direction relative to the fixed frame 706.

In this regard, the first upright 722 may have an outer rail 760 vertically disposed along the length of the first upright 722. Further, an inner rail 762 may be engageable to be slidably coupled to the outer rail 760 and may be partially housed within the outer rail 760. The outer rail 760 may have slightly curved edges to retain the inner rail 762 while allowing the inner rail 762 to slidably move along the outer rail 760. The inner rail 762 may be fixedly attached to the second upright 728, along a length of the second upright 728.

Similarly, each first upright of the fixed frame 706 and second uprights of the movable frame 708 that are adjacent to the first uprights may have an outer and an inner rail disposed thereon. Thus, the inner rail 762 coupled to the second upright 728 and an inner rail coupled to the second upright 729 may slidably move upwards within the outer rails, thus lifting the movable frame 708 upwards relative to the fixed frame 706. Similarly, movable frame 752 may be slidably moved upwards relative to the fixed frame 706.

The fixed frame 706 may also include outer rails 756 and 782 disposed horizontally between first uprights 720 and 722, and the outer rails 758 and 784 disposed horizontally between first uprights 721 and 723. In some embodiments, the fixed frame 706 may also include support bar 786 disposed horizontally between first uprights 720 and 721, and support bar 788 disposed horizontally between first uprights 722 and 723.

The movable frame 708 may include an inner rail 768 disposed horizontally under the second horizontal base 712 and an inner rail 778 disposed horizontally above the second horizontal base 712. The inner rail 768 may be engageable to the outer rail 756 and slidable horizontally along the outer rail 756, and the inner rail 778 may be engageable to the outer rail 782 and slidable horizontally along the outer rail 782, so as to position the movable frame 708 on top of the fixed frame 706 in a tall-narrow mode of operation of the cart 700.

Similarly, the movable frame 708 may include another inner rail (not shown) disposed horizontally under the second horizontal base 712, and inner rail 780 disposed horizontally above the second horizontal base 712. The inner rail (not shown) may be engageable to the outer rail 758 and slidable horizontally along the outer rail 758, and the inner rail 780 may be engageable to the outer rail 784 and slidable horizontally along the outer rail 784, so as to position the movable frame 708 on top of the fixed frame 706 in a tall-narrow mode of operation of the cart 700.

The movable frame 752 may also include two inner rails (not shown) disposed horizontally under the second horizontal base 754, such that the inner rails may be engageable to the outer rails 756 and 758 and slidable horizontally along the outer rails 756 and 758. The movable frame 752 may also include two inner rails 774 and 776 disposed horizontally above the second horizontal base 754, such that the inner rails 774 and 776 may be engageable to the outer rails 782 and 784, respectively, and slidable horizontally along the outer rails 782 and 784, respectively.

In some embodiments, the first uprights 720, 721, 722, and 723 may provide lock mechanisms to constrain the movement of movable frames 708 and 752. For example, in the tall-narrow configuration, the first uprights 720, 721, 722, and 723 may prevent the inner rails of movable frames 708 and 752 from sliding downwards. In the low-wide configuration, the first uprights 720, 721, 722, and 723 may prevent the inner rails of movable frames 708 and 752 from sliding upwards. In some embodiments, the lock mechanism includes a slide latch.

In some embodiments, the cart 700 may include mechanical expansion systems, such as, but not limited to, gas shock, to provide an assistance to the human operator for moving the movable frames 708 and 752.

Figure 8:
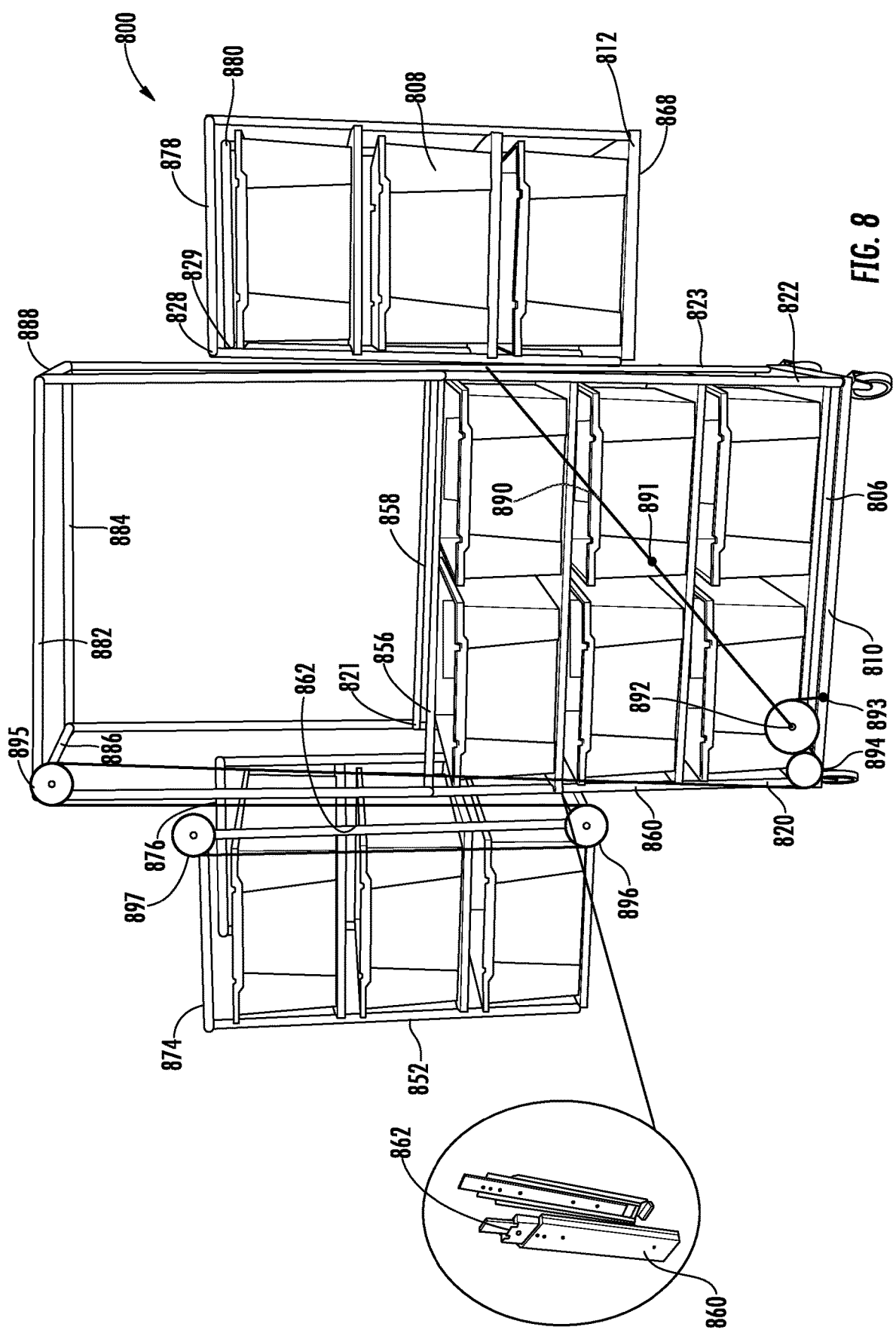
FIG. 8 illustrates an isometric view of a cart with a pulley/lever lift system according to one or more embodiments.

FIG. 8 illustrates a cart 800 in accordance with some embodiments of the present invention. The movable frame 808 (similar to the movable frame 708 described above with reference to FIG. 7) may be slidably movable along the first uprights 822 and 823 in an upward direction and/or a downward direction relative to the fixed frame 806. The movable frame 852 (similar to the movable frame 785 described above with reference to FIG. 7) may be slidably movable along the first uprights 820 and 821 in an upward direction and/or a downward direction relative to the fixed frame 806.

The first upright 822 may have an outer rail 860 vertically disposed along the length of the first upright 822, and an inner rail 862 may be engageable to be slidably coupled to the outer rail 860. Similarly, each first upright of the fixed frame 806 and second uprights of the movable frame 808 that are adjacent to the first uprights may have an outer and an inner rail disposed thereon. Thus, the inner rail 862 coupled to the second upright 828 and an inner rail (not shown) coupled to the second upright 829 may slidably move upwards within the outer rails, thus lifting the movable frame 808 upwards relative to the fixed frame 806. Similarly, movable frame 852 may be slidably moved upwards relative to the fixed frame 806.

The fixed frame 806 may also include the outer rails 856 and 882 disposed horizontally between first uprights 820 and 822, and the outer rails 858 and 884 disposed horizontally between first uprights 821 and 823. In some embodiments, the fixed frame 806 may also include support bar 886 disposed horizontally between first uprights 820 and 821, and support bar 888 disposed horizontally between first uprights 822 and 823.

The movable frame 808 may include an inner rail 868 disposed horizontally under the second horizontal base 812 and an inner rail 878 disposed horizontally above the second horizontal base 812. The inner rail 868 may be engageable to the outer rail 856 and slidable horizontally along the outer rail 856, and the inner rail 878 may be engageable to the outer rail 882 and slidable horizontally along the outer rail 882, so as to position the movable frame 808 on top of the fixed frame 806 in a tall-narrow mode of operation of the cart 800.

Similarly, the movable frame 808 may include another inner rail (not shown) disposed horizontally under the second horizontal base 812, and inner rail 880 disposed horizontally above the second horizontal base 812. The inner rail (not shown) may be engageable to the outer rail 858 and slidable horizontally along the outer rail 858, and the inner rail 880 may be engageable to the outer rail 884 and slidable horizontally along the outer rail 884, so as to position the movable frame 808 on top of the fixed frame 806 in a tall-narrow mode of operation of the cart 800.

The movable frame 852 may also include two inner rails (not shown) disposed horizontally under the second horizontal base 854, such that the inner rails may be engageable to the outer rails 856 and 858 and slidable horizontally along the outer rails 856 and 858. The movable frame 852 may also include two inner rails 874 and 876 disposed horizontally above the second horizontal base 854, such that the inner rails 874 and 876 may be engageable to the outer rails 882 and 884, respectively, and slidable horizontally along the outer rails 882 and 884, respectively.

To facilitate the reconfiguration of cart 800, a pulley/lever lift system is provided. In some embodiments, the pulley/lever lift system is on a rear face of the fixed frame 806. The pulley/lever lift system may include lever 890, pulleys 892, 894, 895, 896, and 897, and cable wire 898.

As shown in FIG. 8, the cable wire 898 is attached to the horizontal base 810 and secured at the cable attachment point 893 of the horizontal base 810. The cable wire 898 wraps around the pulleys 892 (which is movable) and 894 (which is secured on the horizontal base 810). The cable wire 898 also wraps around pulley 895 (which is secured on the support bar 886), pulley 896 (which is secured on a horizontal base of the movable frame 852), and pulley 897 (which is secured on the inner rail 874). The cable wire 898 is further secured at a cable attachment point on the inner rail 874.

The pulley/lever lift system utilizes the cable wire 898 and the lever 890 to cause the movable frame 852 slide vertically along the first uprights 820 and 821. Specially, one end of the lever 890 has one end secured on the pulley 892 and the other end that is freely movable. The lever 890 also pivots at the lever pivot point 891. The lever pivot point 891 is secured on the rear face of the fixed frame 806. When force is applied on the free end of the lever 890 (for example, pushing downwards), lever 890 pivots on the lever pivot point 891, causing the movement of pulley 892 (for example, moving upwards). In this example, the pulley 892 retracts the cable wire 898, resulting in the movable frame 852 to slide downwards.

The pulley/lever lift system scales the amount of force applied to the lever in lifting of the movable frame, and provides mechanical advantages in reconfiguring the cart 800. In some embodiments, a power source may be used to generate the force applied on the lever 890 (such as, for example, a motor).

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A cart for transporting objects, comprising:
a first storage section comprising a fixed frame, wherein the fixed frame comprising:
a first horizontal base having a first storage surface for receiving the objects, and
at least two first uprights disposed at opposite ends of the first horizontal base; and
a second storage section comprising a movable frame, wherein the movable frame comprising:
a second horizontal base having a second storage surface for receiving the objects, and
at least two second uprights disposed at opposite ends of the second horizontal base, wherein the at least two second uprights are slidably attached to the at least two first uprights, and are configured to cause a vertical movement of the movable frame by slidably moving along the at least two first uprights, wherein the fixed frame comprises a support bar extending from the first horizontal base for resting the movable frame.

2. The cart of claim 1, wherein:
each of the at least two first uprights comprises a first outer rail extending along a length of a corresponding first upright; and
each of the at least two second uprights comprises a first inner rail extendably coupled to a corresponding first outer rail of the at least two first uprights, wherein the corresponding first outer rail partially houses the first inner rail, wherein the first inner rail slides relative to the corresponding first outer rail to cause the vertical movement of the movable frame.

3. The cart of claim 2, further comprising:
an actuator disposed on one of the at least two first uprights and connects the fixed frame and the movable frame, wherein the actuator is configured to cause the first inner rail to slide relative to the corresponding first outer rail.

4. The cart of claim 1, wherein:
the fixed frame further comprises at least one second outer rail disposed horizontally above the first storage surface and connects two of the at least two first uprights, and
the movable frame further comprises at least one second inner rail disposed on a bottom surface of the second horizontal base, wherein the at least one second inner rail is configured to cause a horizontal movement of the movable frame by slidably moving along the at least one second outer rail.

5. The cart of claim 4, further comprising one or more lock mechanisms disposed on the at least two first uprights to prevent the vertical movement of the movable frame.

6. The cart of claim 4, wherein:
the fixed frame further comprises at least one third outer rail disposed horizontally and connects two ends of the at least two first uprights, wherein the at least one third outer rail is above and parallel to the at least one second outer rail, and
the movable frame further comprises at least one third inner rail disposed horizontally above the second horizontal base and connects two of the at least two second uprights, wherein the at least one third inner rail is configured to cause the horizontal movement of the movable frame by slidably moving along the at least one third outer rail.

7. The cart of claim 6, further comprising:
a first pulley secured on the first horizontal base;
a second pulley secured on one of the at least one third outer rail;
a third pulley secured on one of at least one second inner rail;
a fourth pulley secured on one of the at least one third outer inner;
a movable pulley connected to a lever, and
a cable wire wrapping around the movable pulley, the first pulley, the second pulley, the third pulley, the fourth pulley, and the movable pulley, wherein a first end of the cable wire is secured on the first horizontal base and a second end of the cable wire is secured on the one of the at least one third inner rail.

8. The cart of claim 1, wherein the fixed frame further comprises at least one wheeled assembly disposed on a bottom surface of the first horizontal base.

9. A cart for transporting objects, comprising:
a first storage section comprising a fixed frame, wherein the fixed frame comprising:
a first horizontal base having a first storage surface and a first bottom surface;
at least one wheeled assembly disposed at the first bottom surface of the first horizontal base; and
at least two first uprights disposed at opposite ends on the first storage surface of the first horizontal base;
a second storage section comprising at least one movable frame, wherein the at least one movable frame comprising:
a second horizontal base having a second storage surface and a second bottom surface, and
at least two second uprights disposed at opposite ends on the second horizontal base; and
at least one support arm pivotally coupled to one of the at least two first uprights of the fixed frame at a first end of the at least one support arm and pivotally coupled to the second bottom surface of the at least one movable frame at a second end of the at least one support arm, wherein the at least one support arm is configured to:
move the second end upwards relative to the first end to place the second horizontal base on top of the fixed frame in a first mode of operation of the cart; and
move the second end downwards relative to the first end to place the second horizontal base adjacent to the first horizontal base in a second mode of operation of the cart, further wherein the fixed frame comprises a support bar extending from the first horizontal base for resting the at least one movable frame in the second mode of operation of the cart.

10. The cart of claim 9, further comprising at least one set of support arms, wherein the at least one set of support arms comprises:

a first support arm pivotally coupled to a front face of the fixed frame at the first end and pivotally coupled to a front face of the at least one movable frame at the second end; and a second support arm pivotally coupled to a rear face of the fixed frame at the first end and pivotally coupled to a rear face of the at least one movable frame at the second end, wherein the second support arm is disposed parallel to the first support arm.

11. The cart of claim 9, further comprising one or more storage surfaces disposed above the first storage surface.

12. The cart of claim 9, further comprising one or more storage surfaces disposed above the second storage surface.

13. The cart of claim 9, further comprising two movable frames positioned at opposite sides of the fixed frame, wherein each of the two movable frames is pivotally coupled to the fixed frame through at least two supports arms.

14. The cart of claim 9, wherein moving the second end upwards relative to the first end comprises lifting the at least one movable frame, pivotally attached to the fixed frame through the at least one support arm, upwards relative to the fixed frame.

15. The cart of claim 9, wherein moving the second end downwards relative to the first end comprises positioning the at least one movable frame, pivotally attached to the fixed frame through the at least one support arm, adjacent to the fixed frame.

16. The cart of claim 9, further comprising one or more removable bins placed on at least one of the first storage surface or the second storage surface of the cart for receiving one or more objects.

17. The cart of claim 9, further comprising a mechanical expansion system configured to engage the at least one support arm for lifting the at least one movable frame.

18. The cart of claim 17, further comprising a lift assist mechanism, wherein the lift assist mechanism comprises:

a first cable wire connected to the first horizontal base;

a second cable wire connected to the second horizontal base; and an actuator connecting the first cable wire and the second cable wire.

* * * * *